United States Patent
Gutman et al.

(10) Patent No.: US 12,212,441 B2
(45) Date of Patent: Jan. 28, 2025

(54) SPECTRUM MANAGEMENT FOR CREST FACTOR REDUCTION DISTORTION

(71) Applicant: QUALCOMM Incorporated, San Diego, CA (US)

(72) Inventors: Igor Gutman, Hod HaSharon (IL); Tao Luo, San Diego, CA (US); Ariel Yaakov Sagi, Haifa (IL); Konstantinos Dimou, New York, NY (US); Junyi Li, Fairless Hills, PA (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 18/158,944

(22) Filed: Jan. 24, 2023

(65) Prior Publication Data

US 2024/0250855 A1    Jul. 25, 2024

(51) Int. Cl.
*H04L 23/02* (2006.01)
*H04L 5/00* (2006.01)
*H04L 25/03* (2006.01)

(52) U.S. Cl.
CPC ...... *H04L 25/03828* (2013.01); *H04L 5/0048* (2013.01); *H04L 5/0098* (2013.01)

(58) Field of Classification Search
CPC ....... H04W 72/12; H04W 8/24; H04W 80/12; H04W 16/28; H04W 4/00; H04B 7/0452; H04B 7/0617; H04B 7/0626; H04B 7/0695; H04L 5/1469; H04L 1/0041; H04L 65/104
USPC ......................................... 375/262, 260, 267
See application file for complete search history.

(56) References Cited

U.S. PATENT DOCUMENTS

| | | | |
|---|---|---|---|
| 2016/0028574 A1* | 1/2016 | Wang | H04L 27/367 375/296 |
| 2017/0187560 A1* | 6/2017 | Ng | H04L 27/2623 |
| 2017/0187561 A1* | 6/2017 | Kwon | H04L 27/2623 |
| 2017/0331650 A1* | 11/2017 | Martinez | H04L 27/2623 |

* cited by examiner

*Primary Examiner* — Khai Tran
(74) *Attorney, Agent, or Firm* — Harrity & Harrity, LLP

(57) ABSTRACT

Various aspects of the present disclosure generally relate to wireless communication. In some aspects, a network node may apply a crest factor reduction (CFR) to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal. The network node may transmit the output signal. Numerous other aspects are described.

30 Claims, 11 Drawing Sheets

KEY:
Reduction noise ----
Output Signal ——

SPECTRUM MANAGEMENT FOR CREST FACTOR REDUCTION DISTORTION

FIELD OF THE DISCLOSURE

Aspects of the present disclosure generally relate to wireless communication and to techniques and apparatuses that perform spectrum management for crest factor reduction distortion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include applying a crest factor reduction (CFR) to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal. The method may include transmitting the output signal.

Some aspects described herein relate to a method of wireless communication performed by a network node. The method may include selecting at least one air interface resource to include in a noise bandwidth that is allocated to CFR noise associated with generating a transmission, the at least one air interface resource being located outside of a transmission frequency band associated with the transmission. The method may include transmitting a noise configuration indication that indicates one or more characteristics associated with the noise bandwidth.

Some aspects described herein relate to a method of wireless communication performed by a user equipment (UE). The method may include receiving a noise configuration indication that indicates one or more characteristics associated with a noise bandwidth that is outside of a transmission frequency band associated with a UE transmission. The method may include applying CFR to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth. The method may include transmitting the output signal.

Some aspects described herein relate to an apparatus for wireless communication at a network node. The apparatus may include a memory and one or more processors coupled to the memory, the memory storing instructions executable by the one or more processors (e.g., directly, indirectly, after pre-processing, without pre-processing) to cause the network node to apply CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal. The one or more processors may be configured to cause the network node to transmit the output signal.

Some aspects described herein relate to an apparatus for wireless communication at a network node. The apparatus may include a memory and one or more processors coupled to the memory, the memory storing instructions executable by the one or more processors to cause the network node to select at least one air interface resource to include in a noise bandwidth that is allocated to CFR noise associated with generating a transmission, the at least one air interface resource being located outside of a transmission frequency band associated with the transmission. The one or more processors may be configured to cause the network node to transmit a noise configuration indication that indicates one or more characteristics associated with the noise bandwidth.

Some aspects described herein relate to an apparatus for wireless communication at a UE. The apparatus may include a memory and one or more processors coupled to the memory, the memory storing instructions executable by the one or more processors to cause the UE to receive a noise configuration indication that indicates one or more characteristics associated with a noise bandwidth that is outside of a transmission frequency band associated with a UE transmission. The one or more processors may be configured to cause the UE to apply CFR to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth. The one or more processors may be configured to cause the UE to transmit the output signal.

Some aspects described herein relate to a non-transitory computer-readable medium that stores a set of instructions for wireless communication by a network node. The set of instructions, when executed by one or more processors of the network node, may cause the network node to apply CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal. The set of instructions, when executed by one or more processors of the network node, may cause the network node to transmit the output signal.

Some aspects described herein relate to a non-transitory computer-readable medium that stores a set of instructions for wireless communication by a network node. The set of instructions, when executed by one or more processors of the network node, may cause the network node to select at least one air interface resource to include in a noise bandwidth that is allocated to CFR noise associated with generating a transmission, the at least one air interface resource being located outside of a transmission frequency band associated with the transmission. The set of instructions, when executed by one or more processors of the network node, may cause the network node to transmit a noise configuration indication that indicates one or more characteristics associated with the noise bandwidth.

Some aspects described herein relate to a non-transitory computer-readable medium that stores a set of instructions for wireless communication by a UE. The set of instructions, when executed by one or more processors of the UE, may cause the UE to receive a noise configuration indication that indicates one or more characteristics associated with a noise bandwidth that is outside of a transmission frequency band associated with a UE transmission. The set of instructions, when executed by one or more processors of the UE, may cause the UE to apply CFR to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth. The set of instructions, when executed by one or more processors of the UE, may cause the UE to transmit the output signal.

Some aspects described herein relate to an apparatus for wireless communication. The apparatus may include means for applying CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal. The apparatus may include means for transmitting the output signal.

Some aspects described herein relate to an apparatus for wireless communication. The apparatus may include means for selecting at least one air interface resource to include in a noise bandwidth that is allocated to CFR noise associated with generating a transmission, the at least one air interface resource being located outside of a transmission frequency band associated with the transmission. The apparatus may include means for transmitting a noise configuration indication that indicates one or more characteristics associated with the noise bandwidth.

Some aspects described herein relate to an apparatus for wireless communication. The apparatus may include means for receiving a noise configuration indication that indicates one or more characteristics associated with a noise bandwidth that is outside of a transmission frequency band associated with a UE transmission. The apparatus may include means for applying CFR to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth. The apparatus may include means for transmitting the output signal.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
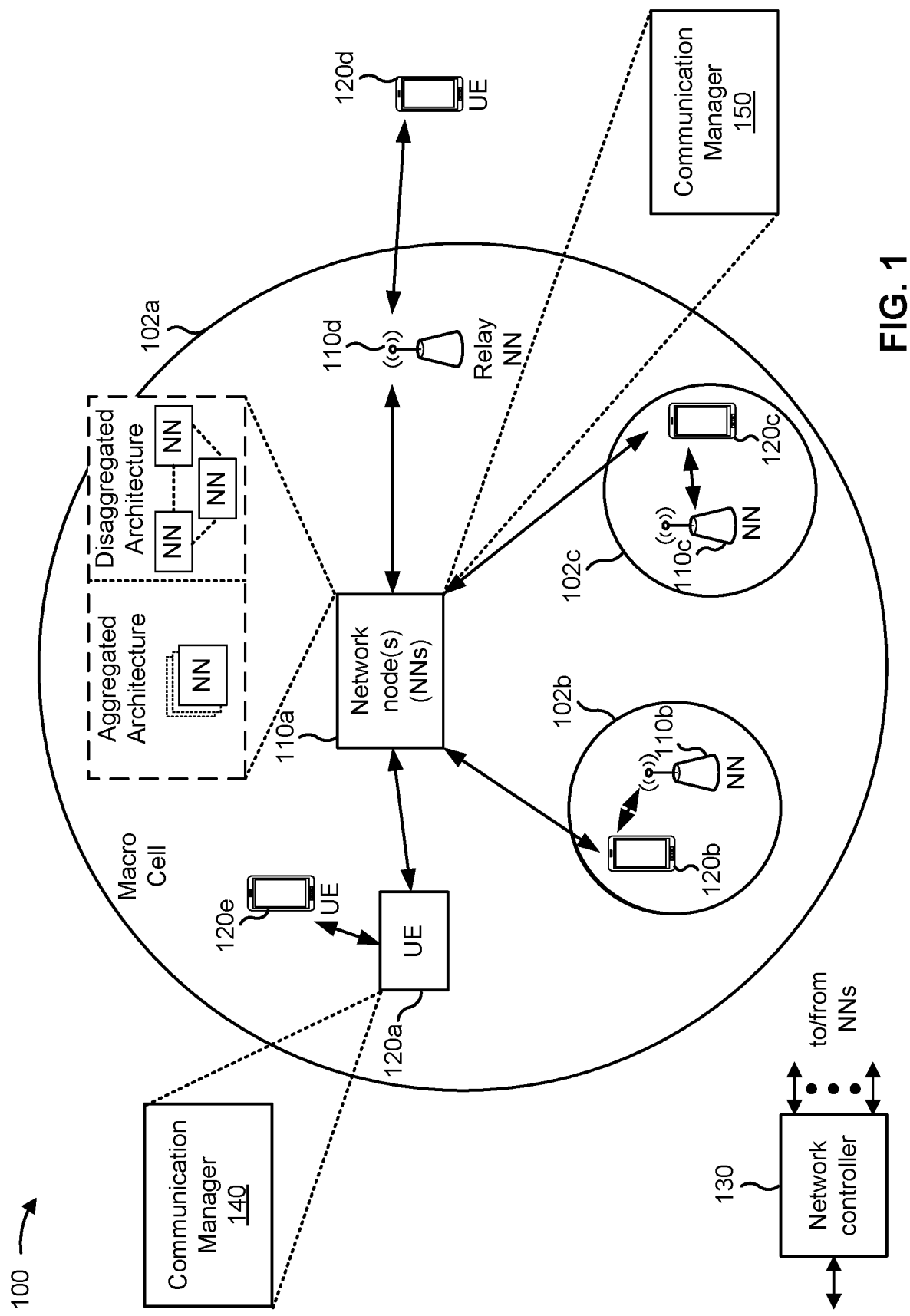
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may apply crest factor reduction (CFR) to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal; and transmit the output signal.

Alternatively or additionally, the communication manager 150 may select at least one air interface resource to include in a noise bandwidth that is allocated to CFR noise associated with generating a transmission, the at least one air interface resource being located outside of a transmission frequency band associated with the transmission; and transmit a noise configuration indication that indicates one or more characteristics associated with the noise bandwidth. Additionally, or alternatively, the communication manager 150 may perform one or more other operations described herein.

In some aspects, a UE (e.g., the UE 120) may include a communication manager 140. As described in more detail elsewhere herein, the communication manager 140 may receive a noise configuration indication that indicates one or more characteristics associated with a noise bandwidth that is outside of a transmission frequency band associated with a UE transmission; apply CFR to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth; and transmit the output signal. Additionally, or alternatively, the communication manager 140 may perform one or more other operations described herein.

As indicated above, FIG. 1 is provided as an example. Other examples may differ from what is described with regard to FIG. 1.

Figure 2:
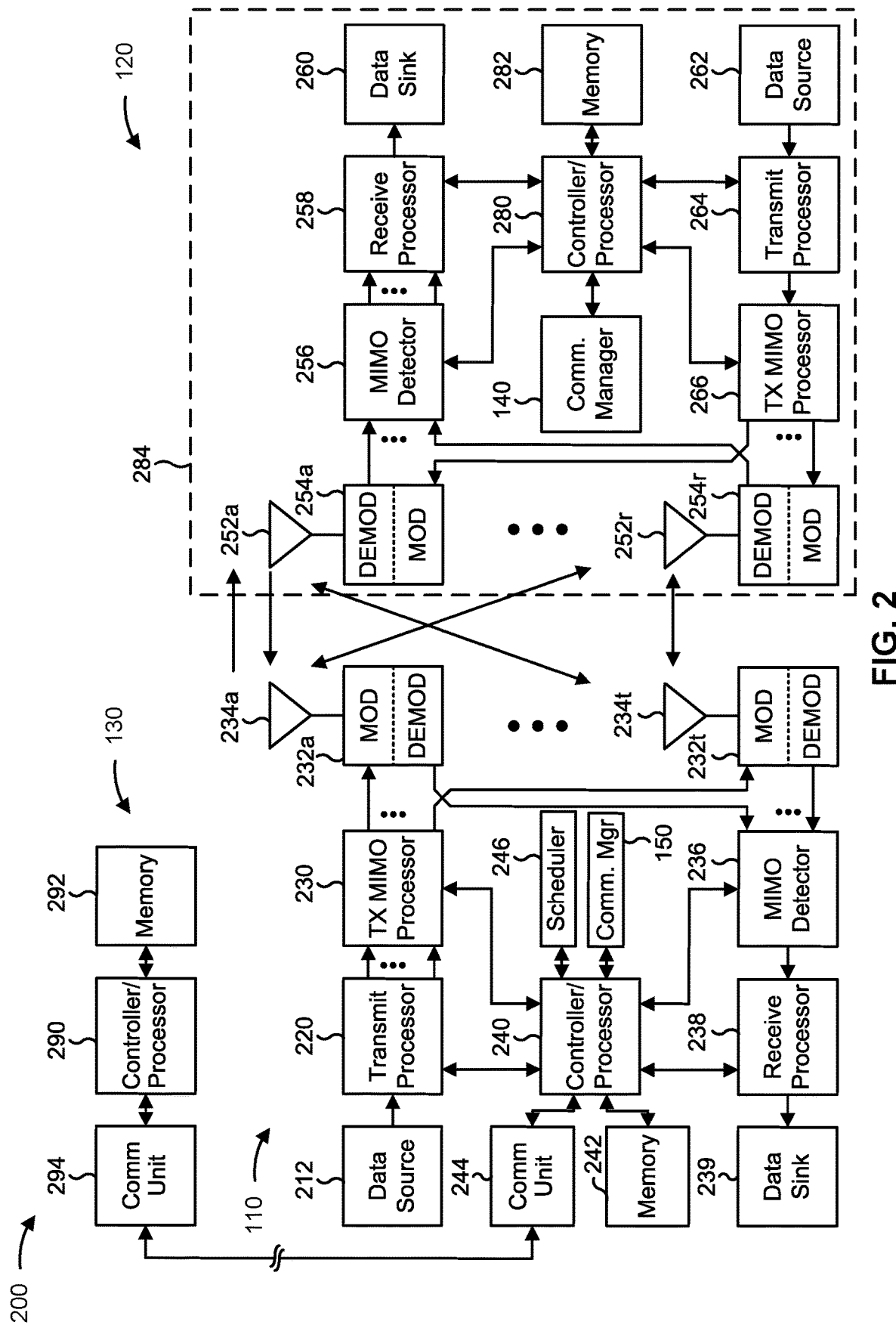
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with spectrum management for CFR distortion, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for applying CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal; and/or means for transmitting the output signal.

Alternatively or additionally, the network node includes means for selecting at least one air interface resource to include in a noise bandwidth that is allocated to CFR noise associated with generating a transmission, the at least one air interface resource being located outside of a transmission frequency band associated with the transmission; and/or means for transmitting a noise configuration indication that indicates one or more characteristics associated with the noise bandwidth. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving a noise configuration indication that indicates one or more characteristics associated with a noise bandwidth that is outside of a transmission frequency band associated with a UE transmission; means for applying CFR to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth; and/or means for transmitting the output signal. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
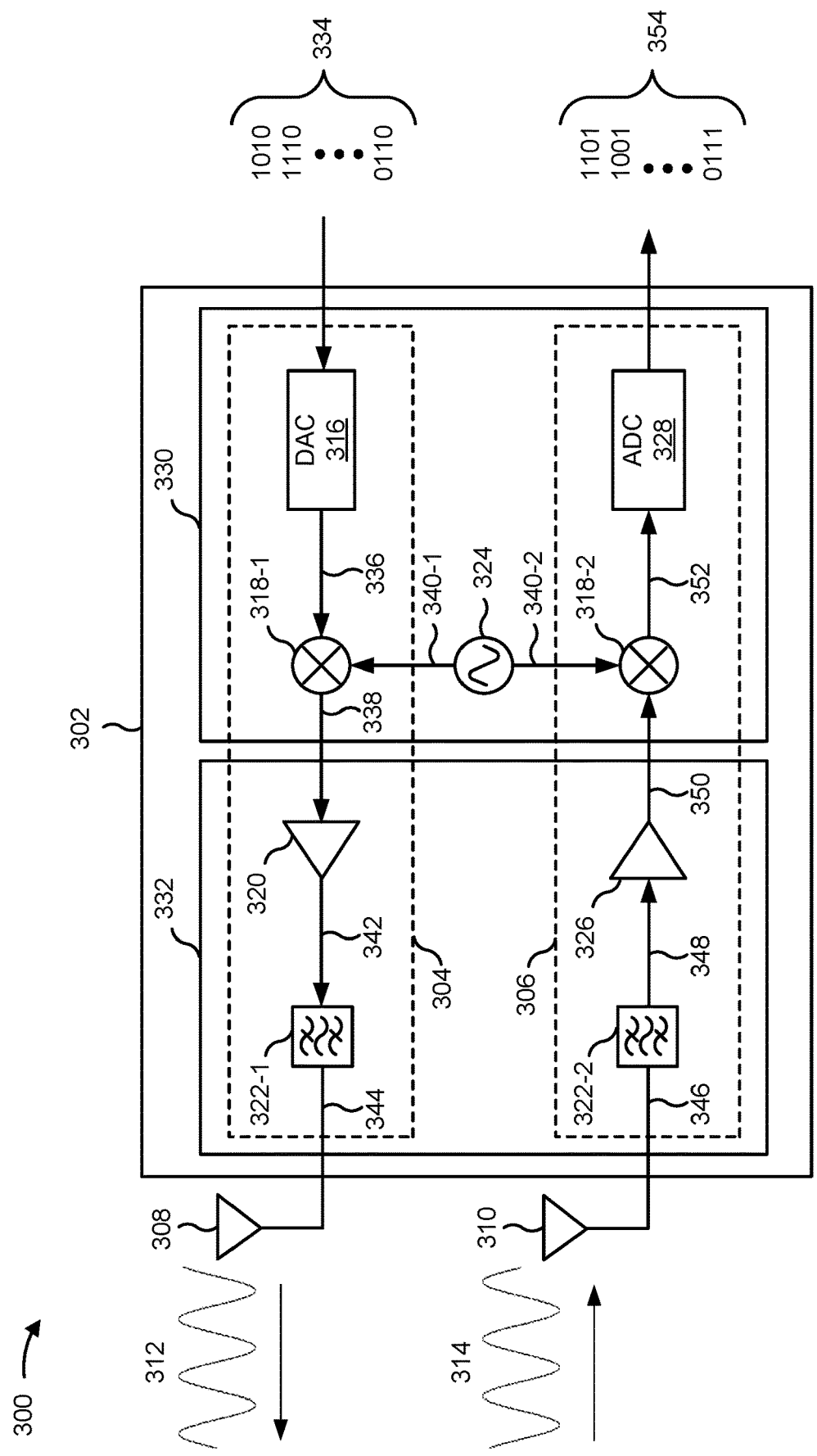
FIG. 3 is a diagram illustrating an example of a wireless transceiver that may be used by a device to communicate in a wireless network, in accordance with the present disclosure.

FIG. 3 is a diagram illustrating an example 300 of a wireless transceiver 302 that may be used by a device to communicate in a wireless network, in accordance with the present disclosure. In some aspects, the wireless transceiver 302 may include, or be included in, one or more components as described with regard to FIG. 2. To illustrate, one or more components of the wireless transceiver 302 may be coupled to, and/or included in, the modem 232 (e.g., one or more of the modems 232a through 232t) and/or the modem 254 (e.g., one or more of the modems 254a through 254r).

A wireless transceiver 302 may include a transmitter 304 (shown with a dashed line) and/or a receiver 306 (shown with a dashed line). As shown in FIG. 3, the transmitter 304 may be coupled to at least a first antenna 308, and the receiver 306 may be coupled to at least a second antenna 310. However, in other examples, the transmitter 304 and the receiver 306 may be coupled to a same antenna through a switch and/or duplexer. In some aspects, the transmitter 304 may generate and transmit an outgoing RF signal 312, and the receiver 306 may receive and process an incoming RF signal 314.

As shown in FIG. 3, the transmitter 304 may include a digital-to-analog converter 316 (DAC 316), a first mixer 318-1, a first amplifier 320 (e.g., a power amplifier), and a first filter 322-1 (e.g., a surface-acoustic-wave (SAW) filter). The first mixer 318-1 may be coupled to a local oscillator (LO) 324. In some aspects, the DAC 316 may be coupled to an application processor or another processor associated with the wireless transceiver 302 (e.g., the modem 232 or the modem 254). Other examples of a transmitter may include multiple DACs, multiple mixers, multiple amplifiers, and/or multiple filters that are not shown in FIG. 3.

The receiver 306 may include a second filter 322-2 (e.g., a SAW filter), a second amplifier 326 (e.g., a low-noise amplifier), a second mixer 318-2, and an analog-to-digital converter 328 (ADC 328). The second mixer 318-2 may be coupled to the LO 324. Alternatively or additionally, the ADC 328 may be coupled to an application processor or another processor associated with the wireless transceiver 302 (e.g., the modem 232 or the modem 254). Other examples of a receiver may include multiple filters, multiple amplifiers, multiple mixers, and/or multiple ADCs that are not shown by the example 300.

In some aspects, the wireless transceiver 302 may be implemented using multiple circuits, such as multiple integrated circuits (ICs). To illustrate, the wireless transceiver 302 may include a transceiver circuit 330 and a radio-frequency front-end (RFFE) circuit 332. Accordingly, components used to form the transmitter 304 and the receiver 306 may be distributed across the multiple circuits. As one example, the transceiver circuit 330 and the RFFE circuit 332 may each include at least some components that form the transmitter 304 and/or at least some components that form the receiver 306. To illustrate, and with regard to the transmitter 304, the transceiver circuit 330 may include the DAC 316 and the first mixer 318-1 of the transmitter 304, and the RFFE circuit 332 may include the first amplifier 320 and the first filter 322-2 of the transmitter 304. Alternatively or additionally, and with regard to the receiver 306, the transceiver circuit 330 may include the second mixer 318-2 and the ADC 328 of the receiver 306, and the RFFE circuit 332 may include the second filter 322-2 and the second amplifier 326 of the receiver 306. In some aspects, the DAC 316 and/or the ADC 328 may be implemented on a circuit separate from the transceiver circuit 330, such as the modem 232 or the modem 254.

In some aspects, the transmitter 304 may generate the outgoing RF signal 312 based at least in part on one or more digital samples 334. A "digital sample", which may alternatively be referred to as a sample, may denote a representation of an analog signal, such as an amplitude representation of the analog signal at a point in time. Each sample of a set of samples that span a time duration may represent the analog signal at a different point in time within the time duration. To illustrate, a first sample may represent the signal at a first point in time, a second sample may represent the signal at a second, different point in time, up to an n'h sample that may represent the signal at an $n^{th}$ point in time, where n is an integer and the points in time that span the time duration may be uniformly separated in time. In some aspects, a sample may capture an in-phase/quadrature (I/Q) signal. For example, a sample may include an in-phase component (I-component) value associated with the I/Q signal at the point in time and a quadrature component (Q-component) value at the point in time. A sample associated with an I/Q signal (e.g., that includes an I-component and a Q-component) may alternatively or additionally be referred to as a complex sample.

In some aspects, the DAC 316 may receive, as the digital sample(s) 334, one or more samples associated with a pre-upconversion signal (e.g., a baseband signal or an intermediate frequency (IF) signal). In some aspects, the DAC 316 may receive one or more samples that include crest factor reduction (CFR) and/or digital pre-distortion (DPD) as further described with regard to FIG. 4. Using the digital sample(s) 334, the DAC 316 may generate, as an output, an analog pre-upconversion signal 336.

The first mixer 318-1 may receive the analog pre-upconversion signal 336 as input, and generate, as an output, a prefiltered upconverted signal 338 using an LO signal 340-1 provided by the LO 324. The prefiltered upconverted signal 338 may be an RF signal and/or may include some noise and/or unwanted frequencies, such as a harmonic frequency and/or CFR noise. The first amplifier 320 may receive the prefiltered upconverted signal 338 and generate an amplified prefiltered signal 342.

The first filter 322-2 may receive the amplified prefiltered signal 342 as input and filter the amplified pre-filter transmit signal 342 to generate a filtered transmit signal 344. As part of the filtering process, the first filter 322-2 may attenuate the noise or unwanted frequencies included in the prefiltered upconverted signal 338 and/or the amplified prefiltered signal 342. The transmitter 304 may provide the filtered transmit signal 344 to the first antenna 308 for transmission as the outgoing RF signal 312.

In some aspects, the receiver 306 may receive the incoming RF signal 314 using the second antenna 310. As shown in FIG. 3, the second antenna 310 may generate a prefiltered receive signal 346. The second antenna 310 may be coupled to the second filter 322-2, and the second filter 322-2 may receive and filter the prefiltered receive signal 346 to remove noise and/or unwanted frequencies. Accordingly, the second filter 322-2 may generate a filtered receive signal 348.

The second amplifier 326 may receive and amplify the filtered receive signal 348 to generate an amplified filtered receive signal 350. Based at least in part on being coupled to the second amplifier 326, the second mixer 318-2 may receive the amplified filtered receive signal 350 and down-convert the amplified filtered receive signal 350 using an LO signal 340-2 (e.g., from the LO 324) to generate a downconverted receive signal 352, which may be a baseband signal or an IF signal. The ADC 328 may receive the downconverted receive signal 352 and generate a digital signal by generating one or more digital samples 354 as output. The one or more digital samples 354 may be processed by a processor associated with the wireless transceiver 302 and/or another processor, such as a processor associated with the modem 232 or the modem 254.

As indicated above, FIG. 3 is provided as an example. Other examples may differ from what is described with regard to FIG. 3.

Figure 4:
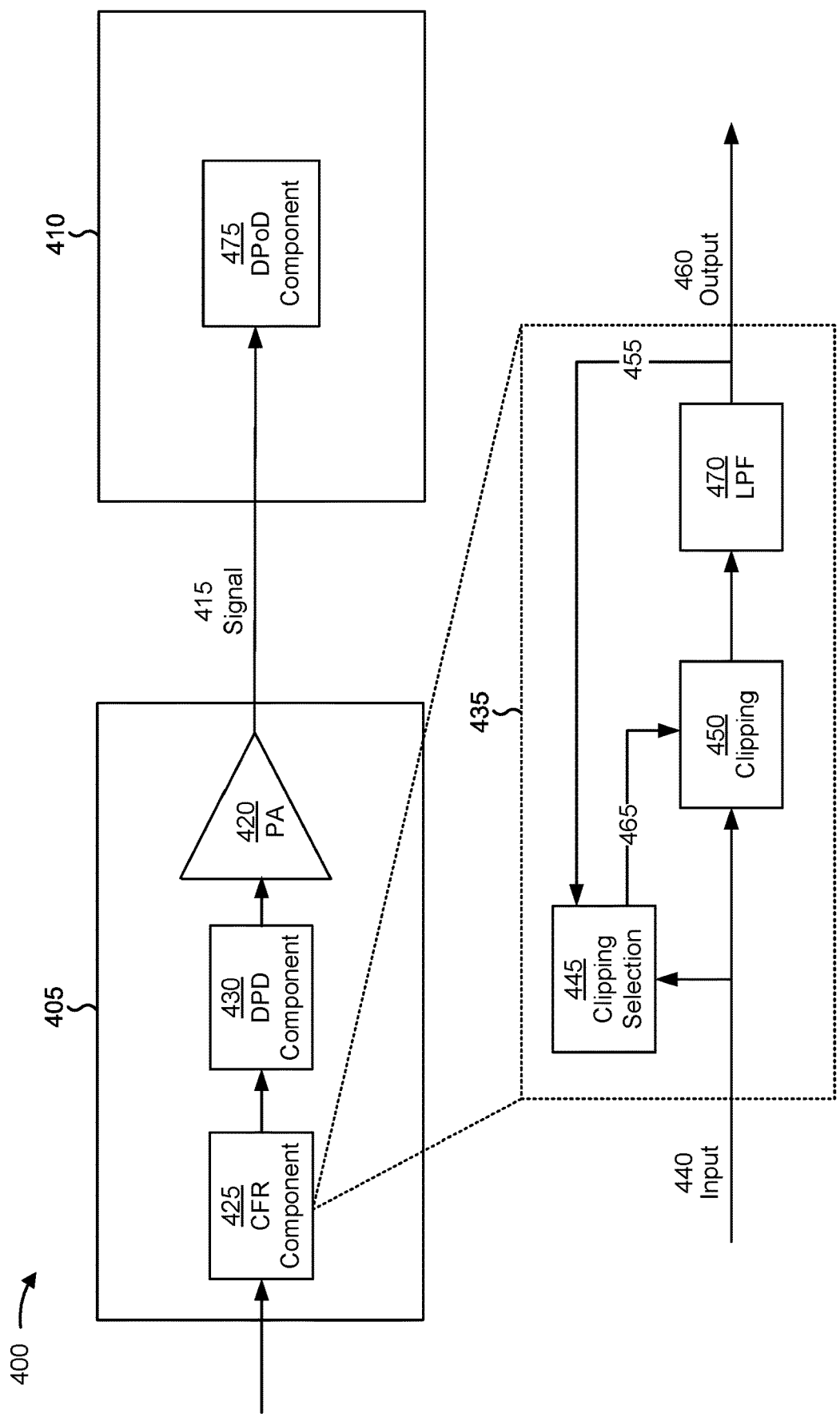
FIG. 4 is a diagram illustrating an example that includes a transmitter that may include crest factor reduction (CFR) capabilities and/or digital pre-distortion capabilities, and a receiver that may include digital post-distortion capabilities, in accordance with the present disclosure.

FIG. 4 is a diagram illustrating an example 400 that includes a transmitter 405 that may include CFR capabilities and/or DPD capabilities, and a receiver 410 that may include digital post-distortion (DPOD) capabilities, in accordance with the present disclosure. As shown in FIG. 4, the transmitter 405 may communicate with the receiver 410 using a wireless signal 415. In some aspects, a network node 110 (e.g., any network node described with regard to a disaggregated base station architecture) may include the transmitter 405 and UE 120 may include the receiver 410. Alternatively or additionally, the UE 120 may include the transmitter 405 and the network node 110 may include the receiver 410. The block diagrams associated with the transmitter 405 and with the receiver 410 shown by the example 400 have been simplified for discussion purposes. Other examples may include alternative or additional features that have been omitted for clarity. For example, the transmitter 405 may include one or more components of the transmitter 304 described with regard to FIG. 3. Alternatively or additionally, the receiver 410 may include one or more components of the receiver 306 described with regard to FIG. 3 (or vice versa).

As shown in FIG. 4, the transmitter 405 may communicate with the receiver 410 based at least in part on transmitting the signal 415 to the receiver 410. The signal 415 may be pre-processed by the transmitter 405 to, among other benefits, reduce a power-back off value associated with transmission of the signal 415 to the receiver 410.

To illustrate, in some communications systems, the transmitter 405 may transmit signals with increasing nonlinearity based at least in part on power increases. For example, the transmitter 405 may include a power amplifier (PA) 420 (which, in some aspects, may be a high-power amplifier) with a limited dynamic range that may distort a transmitted signal as a result of a relatively high peak-to-average power ratio (PAPR). In some aspects, the PA 420 may be considered the first amplifier 320 as described with regard to FIG. 3. The nonlinear distortion may be an in-band distortion, which affects link performance in connection with mutual information and/or an error vector magnitude (EVM) amount, or an out-band distortion, which causes adjacent channel interference (ACI) and/or results in a high adjacent channel leakage ratio (ACLR) (e.g., the transmitted signal interferes with other signals on neighboring frequency bands, with the ACI and/or ACLR indicating how much the adjacent channel is polluted by a main transmission). To avoid nonlinearity distortions and accompanying interference, the transmitter 405 may apply a power back-off value to reduce transmit power, thereby reducing nonlinearity.

In some aspects, applying a power back-off value may result in reduced power efficiency (e.g., less available transmit power is used to transmit in a channel, thereby reducing range, signal-to-interference-plus-noise ratio, and/or the like). To illustrate, based at least in part on applying the power back-off value, the transmitter 405 may transmit the signal 415 with less power in channel and may dissipate more power as heat, which may result in reduced power efficiency. Accordingly, the transmitter 405 may use one or more pre-transmission signal processing techniques to reduce the power back-off value. For example, the transmitter may utilize CFR processing and/or DPD processing. CFR processing may reduce the dynamic range of the signal, while DPD processing may reduce nonlinear distortion to less than a threshold level with a reduced level of power back-off, thereby increasing power efficiency relative to avoiding nonlinear distortion using only a power back-off. As shown in FIG. 4, the transmitter 405 may thus include a CFR component 425 for performing CFR processing to the signal 415 (e.g., to reduce PAPR in the signal 415 as much as possible and thus reduce the power back-off value). Alternatively or additionally, the transmitter 405 may include a DPD component 430 for performing DPD processing to the signal 415 (e.g., to linearize the power amplifier's response).

CFR component 435 is an example CFR component that performs a CFR process on an input signal 440 based at least in part on iterative clipping and filtering (ICF). While the CFR process performed by the CFR component 435 is based at least in part on ICF, other CFR processes may be based at least in part on pulse injection, peak cancellation, and/or peak windowing. For clarity, the CFR component 435 has been simplified, and other examples may include alternative or additional components.

The CFR component 435 may include a clipping selection component 445 and a clipping component 450 that each receive the input signal 440. In some aspects, the input signal 440 may be a digital signal as described with regard to FIG. 3, such as one or more samples of a digital baseband signal and/or a digital upconverted signal. In other aspects, the input signal 440 may be an analog signal, such as in a transmitter that excludes a DPD component. The clipping selection component 445 may select a clipping factor (e.g., a clipping level, a clipping threshold, a clipping value, and/or a clipping ratio) to apply to the input signal 440. As one example, the clipping selection component 445 may select the clipping factor based at least in part on a target PAPR for an output signal. Alternatively or additionally, the clipping selection component 445 may select the clipping factor based at least in part on the input signal 440. In some aspects, the clipping selection component 445 may select the clipping factor based at least in part on feedback, as shown by reference number 455 (e.g., feedback associated with an output signal 460).

As shown by reference number 465, the clipping selection component 445 may indicate the clipping factor to the clipping component 450, and the clipping component 450 may generate a clipped output signal based at least in part on the clipping factor. For example, the clipping component 450 may clip a sample value of the input signal 440 (e.g., a digital value) based at least in part on the sample value satisfying a clip threshold. That is, the clipping component 450 may change the sample value to a maximum value based at least in part on a clip threshold indicated by the clipping selection component 445 and/or a maximum value indicated by the clipping selection component 445. Clipping peak values of a signal (e.g., setting the peak values to a maximum (allowed) value) may introduce clipping noise into the signal that may alternatively be referred to as CFR noise (e.g., noise introduced to a signal based at least in part on applying CFR to the signal). Accordingly, the CFR component 435 may include a low-pass filter (LPF) component 470 that filters out-of-band noise (e.g., CFR noise that is located outside of a transmission frequency band) to reduce distortion in the output signal 460. In some aspects, the CFR component 435 may iteratively clip and/or filter the input signal 440 to generate the output signal 460. For instance, a first iteration may generate a first clipped input signal based at least in part on the clipping component 450 applying clipping to the input signal 440 and/or the LPF component 470 filtering the (clipped) input signal. A second iteration may generate a second clipped input signal based at least in part on clipping and/or filtering the first clipped signal. Accordingly, the output signal 460 may be based at least in part on iterative clipping and/or iterative filtering, where each iteration may add more reduction and/or clipping noise.

In some aspects, CFR processing may introduce in-band distortion (e.g., EVM distortion) and/or out-of-band distortion (e.g., ACI distortion). DPD processing (e.g., by the DPD component 430) may mitigate an in-dynamic-range nonlinearity effect. As shown in FIG. 4, the receiver 410 may apply DPOD processing to the signal 415, that is directed to processing for only EVM instead of processing for both EVM and ACI. More particularly, DPOD processing may be performed by a DPOD component 475 at the receiver 410, which may include hardware and/or software configured to implement an algorithm configured to remove nonlinear noise that is generated by a known model (e.g., PA clipping). DPOD processing may allow for reduced power back-off values and greater power efficiency.

A device may include CFR processing to reduce a PAPR of a signal and improve a power efficiency of a power amplifier processing the signal. However, the CFR processing may introduce distortion to the signal that results in the device failing to meet an operating metric specified by a wireless network, a communication standard, and/or a governing body (e.g., the Federal Communications Commission (FCC), the International Telecommunication Union (ITU), and/or the Ministry of Information Industry (MII), among other examples). To illustrate, a communication standard may specify, as an operating metric, an EVM metric, an ACLR metric, an operating band unwanted emission (OBUE) metric, and/or an in-band emission (IBE) metric. In some aspects, the communication standard may specify that meeting the operation metric is a requirement for a device to operate in a wireless network that implements the communication standard. For instance, the communication standard may specify an expected modulation quality by specifying a respective EVM metric for each supported modulation order. Alternatively or additionally, the communication standard may specify an expected emission quality based at least in part on specifying an ACLR metric associated with a first configured bandwidth for a downlink transmission, an ACLR metric associated with a second configured bandwidth for an uplink transmission, an OBUE metric for an operating band, and/or an IBE metric for an in-band transmission. A wireless network implementing the communication standard may allow devices that meet the metric(s) (e.g., EVM, ACLR, OBUE, and/or IBE) access to the wireless network and/or disallow access to devices that fail to meet the metric(s). Accordingly, CFR noise may result in a device failing to meet one or more operating metrics and, subsequently, prevent the device from accessing a wireless network. Alternatively or additionally, the CFR noise may occupy spectrum assigned to and/or utilized by another device, resulting in increased recovery errors, reduced data throughput, and/or increased data transfer latencies by the other device.

Some techniques and apparatuses described herein provide spectrum management for CFR distortion. A network node may apply CFR to an input signal to generate an output signal. In some aspects, applying the CFR to the input signal may include applying a shaping filter that distributes the CFR noise, such as a shaping filter that distributes a first portion of the CFR noise within a transmission frequency band of the output signal and/or a second portion of the CFR noise in at least one air interface resource (e.g., a frequency resource and/or a time resource) that is outside of the transmission frequency band of the output signal. A shaping filter, such as a least-squares filter, may convert an input waveform to another output waveform, such as by converting an input waveform at a first frequency to an output waveform at a second frequency. Accordingly, the shaping filter may distribute the CFR noise to within the transmission frequency band (e.g., and attenuate CFR noise outside of the transmission frequency band), distribute the CFR noise to outside of the transmission frequency band (e.g., and attenuate CFR noise within the transmission frequency band), and/or distribute the CFR noise to both within the transmission frequency band and outside of the transmission frequency band. The network node may transmit the output signal.

In some aspects, a network node may select at least one air interface resource (e.g., characterized based at least in part on a frequency resource and/or a time resource) to include in a noise bandwidth that is allocated to CFR noise associated with generating a transmission. For example, the network node may select the air interface resource(s) outside of a transmission frequency band associated with the transmission. In some aspects, the network node may transmit a noise configuration indication that indicates one or more characteristics associated with the noise bandwidth. Alternatively or additionally, the network node may indicate to distribute CFR noise to the noise bandwidth (e.g., and/or attenuate CFR noise outside of the noise bandwidth).

In some aspects, a UE may receive a noise configuration indication that indicates one or more characteristics associated with a noise bandwidth that is outside of a transmission frequency band associated with a UE transmission (e.g., an uplink transmission and/or a sidelink transmission). However, in other aspects, the noise bandwidth may be associated with a downlink transmission. The UE may apply CFR to an input signal, such as by applying ICF to the input signal, to generate an output signal. In applying the CFR to the input signal, the UE may apply a shaping filter that distributes a first portion of CFR noise to within the transmission frequency band and/or a second portion of the CFR noise to at least one air interface resource included in the noise bandwidth. That is, the UE may apply a shaping filter that distributes the CFR noise to within the transmission frequency band (e.g., and/or attenuates CFR noise outside of the transmission frequency band), distributes the CFR noise to outside of the transmission frequency band (e.g., and/or attenuates CFR noise that is within the transmission frequency band), and/or distributes the CFR noise to both within the transmission frequency band and outside of the transmission frequency band. Based at least in part on applying the CFR and/or the shaping filter, the UE may transmit the output signal, such as by transmitting the output signal as an uplink transmission to a network node and/or by transmitting the output signal as a sidelink transmission to another UE.

Applying CFR to an input signal may reduce a PAPR of the input signal and improve a power efficiency of a power amplifier processing the input signal. Distributing CFR noise to an out-of-band location (e.g., a noise bandwidth outside of a transmission frequency bandwidth) may enable a device (e.g., a network node and/or a UE) to meet an in-band EVM metric (e.g., an EVM metric specified for a transmission frequency band and/or a modulation order). That is, shifting CFR noise to an out-of-band location may mitigate distortion added by the CFR noise for in-band frequencies and enable a transmitting device to meet an EVM metric at a tradeoff of increasing a bandwidth of the transmitted signal. However, in some scenarios, such as scenarios in which a wireless network is operating at low capacity, the use of an increased bandwidth to mitigate EVM distortion may have lesser impact on the wireless network. To illustrate, a network node may determine to increase the bandwidth of a transmission in low-capacity scenarios where air interface resources of the network node are available and/or are not strained. Some examples of low-capacity scenarios may include when the network node encounters sparse traffic (e.g., an amount of traffic that satisfies a low threshold), when an adjacent network node encounters sparse traffic (e.g., and can grant access to resources), and/or when the adjacent network node operates using a low modulation order associated with lesser EVM requirements. Alternatively or additionally, the network node and the adjacent network node (e.g., with an adjacent frequency band as described below) may coordinate to share a noise bandwidth to mitigate distortion caused by CFR noise and reduce a volume of resources used for a noise bandwidth.

In some aspects, the network node may partition a configured bandwidth to include a transmission frequency band and an out-of-band noise band and distribute CFR noise (and/or direct another device to distribute CFR noise) to the out-of-band noise band. By partitioning the configured bandwidth to include both the transmission frequency band and the out-of-band noise band, the network node may allocate air interface resources to CFR noise and avoid occupying spectrum assigned to and/or utilized by another device. Alternatively or additionally, the network node may request access to out-of-band air interface resource(s) that are assigned to a second network node, such as in an example in which the transmission frequency band is equal to the configured bandwidth. Based at least in part on the second network node granting access to the out-of-band air interface resource(s), the network node may distribute and/or shift CFR noise to the out-of-band air interface resource(s) to improve in-band EVM and avoid occupying spectrum assigned to and/or utilized by another device (e.g., by coordinating access with the second network node). Accordingly, a network node may manage distribution and/or a shifting of CFR noise to an out-of-band location to mitigate an increase in EVM associated with an in-band transmission and improve a modulation quality. Thus, shifting the CFR noise to an out-of-band location based at least in part on partitioning a configured band and/or coordinating access with another network node may avoid transmission collisions in spectrum assigned to another device, reduce recovery errors, increase data throughput, and/or reduce data transfer latencies in the wireless network.

As indicated above, FIG. 4 is provided as an example. Other examples may differ from what is described above.

Figure 5B:
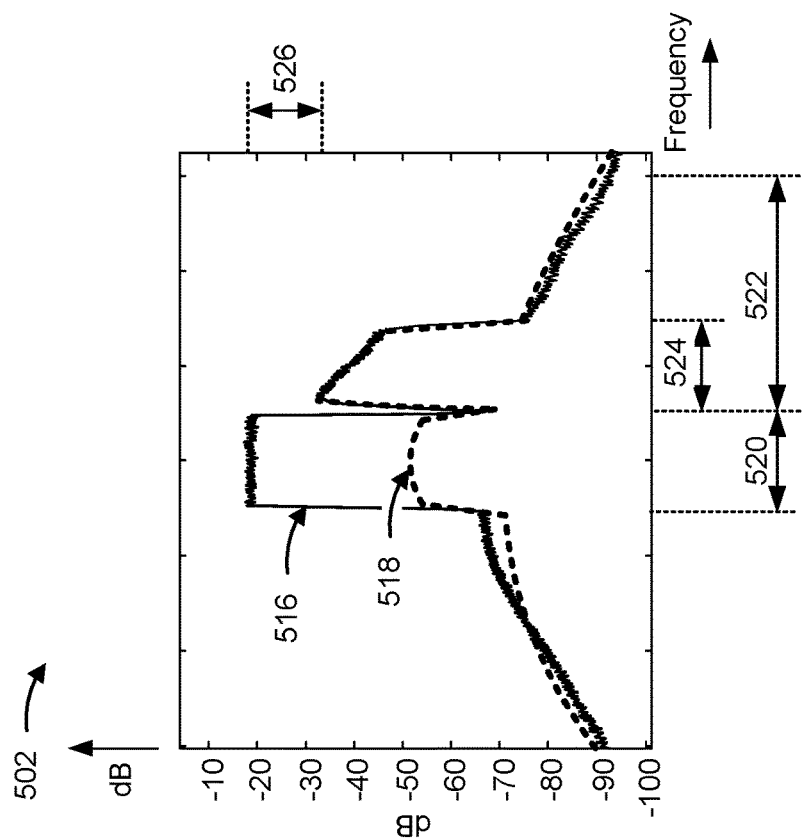
FIGS. 5A and 5B are diagrams illustrating a first example and a second example, respectively, of out-of-band CFR noise, in accordance with the present disclosure.
Figure 5A:
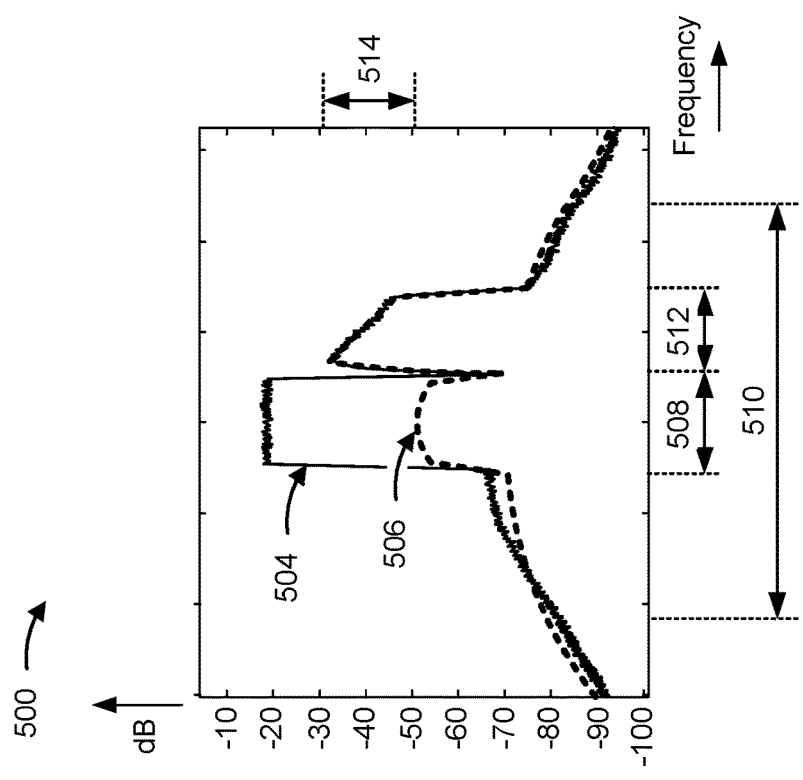

FIGS. 5A and 5B are diagrams illustrating a first example 500 and a second example 502, respectively, of out-of-band CFR noise, in accordance with the present disclosure.

A device may apply CFR to an input signal to improve a power efficiency of a transmitter as described above. While applying CFR to a signal may improve power efficiency, CFR noise may result in a signal distortion that causes a device to fail to meet an operating metric. In some aspects, a device may mitigate distortion introduced by CFR noise based at least in part on distributing and/or shifting at least a portion of the CFR noise to out-of-band spectrum.

The first example 500 shown by FIG. 5A illustrates a first frequency versus power graph that includes a first output signal 504 (shown with a solid line). The first output signal 504 may be based at least in part on CFR noise 506 (shown with a dashed line) added to an input signal as part of a CFR process. A horizontal axis of the first frequency versus power graph shown by the first example 500 represents frequency, and a vertical axis represents power in decibels (dB). In the first example 500, a transmission frequency band 508 associated with a device (e.g., a network node and/or a UE) is a portion of a configured bandwidth 510 assigned to the device. To illustrate, the configured bandwidth 510 may be assigned (e.g., by a network operator of a wireless network) to a network node for downlink communications to one or more UEs. The network node may partition the configured bandwidth 510 into one or more sub-bands, and communicate with one or more respective UEs based at least in part on a respective sub-band of the configured bandwidth 510.

In some aspects, the network node may assign a first sub-band of the configured bandwidth 510 (e.g., the transmission frequency band 508) to a downlink communication (e.g., the output signal 504) to a UE. Alternatively or additionally, the network node may assign a second sub-band of the configured bandwidth (shown as noise bandwidth 512) to a virtual UE. That is, by assigning the noise bandwidth 512 to a virtual UE, the network node may refrain from assigning the noise bandwidth 512 to another UE communicating with the network node. The network node may instead use the noise bandwidth 512 assigned to the virtual UE for CFR noise. To illustrate, and as shown by reference number 514, the network node may distribute (e.g., by way of a shaping filter) CFR noise with a higher power level to the noise bandwidth 512 relative to CFR noise in the transmission frequency band 508. In some aspects, and as further described with regard to FIG. 6, a network node may transmit a noise configuration indication that specifies one or more characteristics of the noise bandwidth 512 (e.g., a bandwidth size, a center frequency, and/or a frequency offset), and another device (e.g., a UE and/or another network node) may distribute respective CFR noise to the noise bandwidth 512. Accordingly, a network node may use a first partition of a configured bandwidth as a transmission frequency band (e.g., uplink and/or downlink) and a second partition of the configured bandwidth for CFR noise.

As shown by FIG. 5B, the second example 502 illustrates a second frequency versus power graph that includes a second output signal 516 (shown with a solid line) that is based at least in part on CFR noise 518 (shown with a dashed line) added to an input signal as part of a CFR process. A horizontal axis of the second frequency versus power graph shown by the second example 502 represents frequency, and a vertical axis represents power in dB.

In the second example 502, a transmission frequency band 520 assigned to a device (e.g., a network node or a UE) is approximately equal (e.g., within a difference threshold) in size to a configured bandwidth assigned to the device. For example, a network node may assign an entirety of the configured bandwidth (e.g., the transmission frequency band 520) to a downlink communication from the network node to a UE and/or to an uplink communication from the UE to the network node. To mitigate CFR noise associated with a CFR process, and as further described with regard to FIG. 6, the network node may transmit a request for access to at least a portion of a second frequency band 522 assigned to a second, different device.

To illustrate, the transmission frequency band 520 may be assigned to a first network node by a network operator of a wireless network, and the network operator may assign the second frequency band 522 to a second network node operating in the wireless network. Accordingly, the first network node and the second network node may be associated with a same wireless network and/or a same network operator. In some aspects, the first network node may transmit a request to the second network node for access to a portion of the second frequency band 522 (e.g., adjacent frequency band 524), such as through a backhaul link and/or by relaying the request through a core network. Based at least in part on the second network node granting access to the adjacent frequency band 524, the first network node may distribute CFR noise (and/or instruct a UE to distribute CFR noise) to the adjacent frequency band 524. That is, the network node may use, and/or instruct a UE to use, the adjacent frequency band 524 as a noise bandwidth. In granting the first network node access to the adjacent frequency band 524, the second network node may indicate one or more conditions for using the adjacent frequency band 524, such as a power ratio and/or power level difference between a transmission power level in the transmission frequency band 520 and a CFR noise power level in the adjacent frequency band 524, as shown by reference number 526.

Distributing CFR noise to an out-of-band location may enable a device to meet an operating metric associated with operating in a wireless network, such as an in-band EVM metric. Accordingly, the device may distribute and/or shift CFR noise to the out-of-band air interface resource(s) to improve an in-band signal quality (e.g., by reducing in-band EVM). In some aspects, the device may coordinate access to the out-of-band air interface resource(s) and/or partition a configured band assigned to the device to avoid occupying spectrum assigned to and/or utilized by another device. Avoiding spectrum assigned to another device reduces recovery errors, increases data throughput, and/or reduces data transfer latencies in the wireless network.

As indicated above, FIGS. 5A and 5B are provided as examples. Other examples may differ from what is described with regard to FIGS. 5A and 5B.

Figure 6:
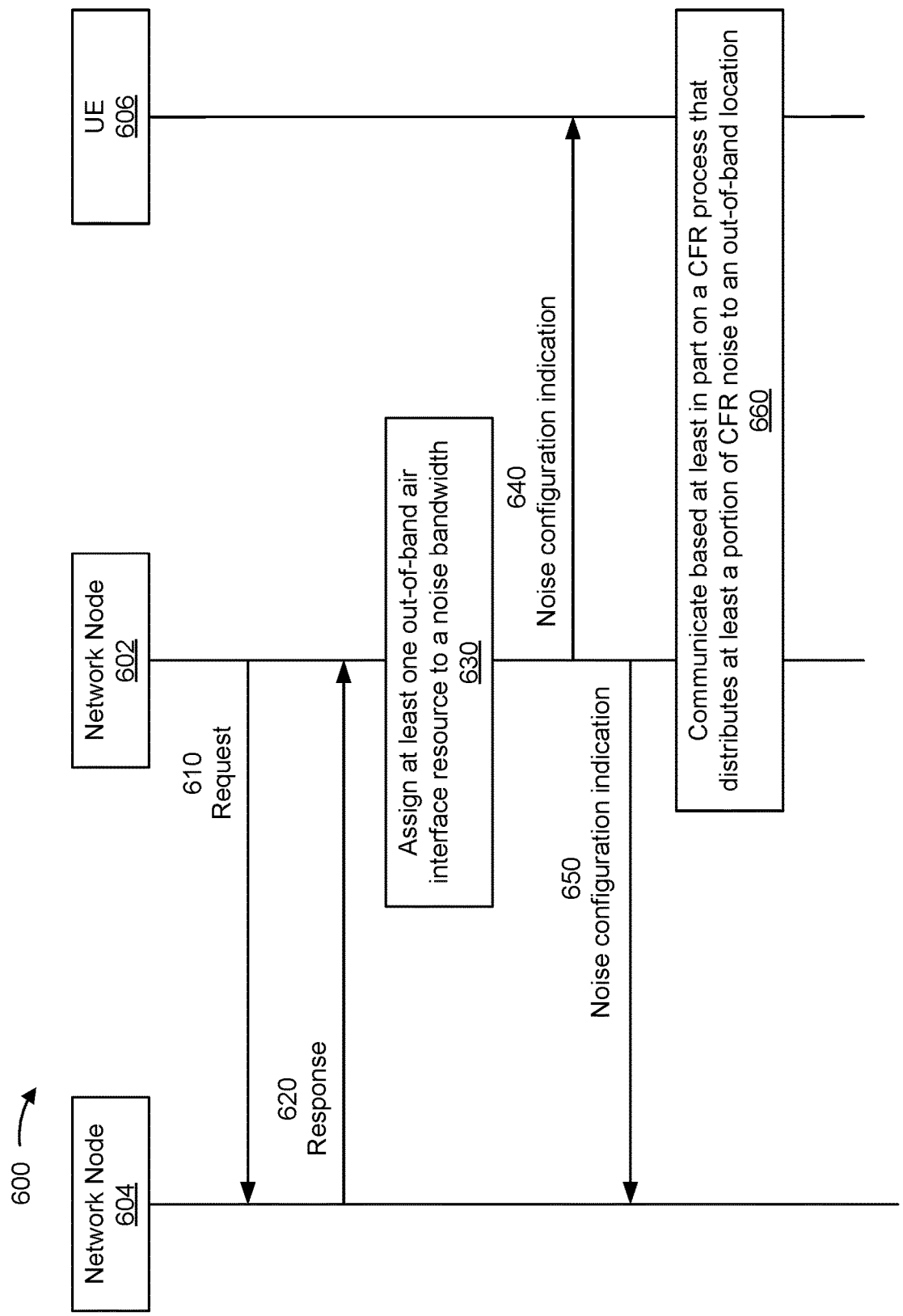
FIG. 6 is a diagram illustrating an example of a wireless communication process between at least a first network node, a second network node, and a UE, in accordance with the present disclosure.

FIG. 6 is a diagram illustrating an example 600 of a wireless communication process between at least a first network node 602 (e.g., a network node 110), a second network node 604 (e.g., another network node 110), and a UE 606 (e.g., a UE 120), in accordance with the present disclosure. While the example 600 includes the second network node 604, other examples may exclude the second network node 604. Alternatively or additionally, some examples may include a second UE (e.g., another UE 120) as described below.

As shown by reference number 610, a first network node 602 may transmit, and a second network node 604 may receive, a request for access to one or more air interface resources assigned to the second network node 604. To illustrate, the first network node 602 and the second network node 604 may be associated with a same wireless network and/or a same network operator. In some aspects, the network operator may assign a first set of air interface resources to the first network node 602 and a second set of air interface resources to the second network node 604, where the second set of air interface resources are adjacent to and/or near (e.g., within a threshold) the first set of air interface resources. For example, a first frequency band included in the first set of air interface resources may be adjacent to a second frequency band included in the second set of air interface resources. The first network node 602 may determine to use at least a portion of the second frequency band for a noise bandwidth as described with regard to FIG. 5B, such as in examples in which a transmission frequency band associated with the first network node 602 (e.g., a downlink transmission frequency band, an uplink transmission frequency band, and/or a Mode 1 sidelink transmission frequency band) uses an entirety of a configured bandwidth, uses a portion of a configured band that is within a threshold of the entirety, and/or is adjacent in frequency to the second frequency band.

In some aspects, the first network node 602 may transmit an allocation request that indicates a request for access to the air interface resource(s), such as by using a wired backhaul link and/or a wireless backhaul link between the first network node 602 and the second network node 604. The first network node 602 may transmit the allocation request directly to the second network node 604 or through one or more additional devices. As one example, the first network node 602 may transmit the allocation request to a core network that connects to both the first network node 602 and the second network node 604, and the core network may relay the allocation request to the second network node 604. The allocation request may indicate one or more characteristics associated with the air interface resource(s), such as a bandwidth and/or a frequency offset. Alternatively, or additionally, the allocation request may indicate a power ratio that is based at least in part on an expected power level of a signal (e.g., CFR noise) in the air interface resource(s) relative to an adjacent transmission. In some aspects, the allocation request may specify an allocation type, such as a periodic allocation type or a semi-persistent scheduling (SPS) allocation type. The allocation request may identify the (requested) air interface resource(s), such as by indicating an index, a sub-band, and/or a sub-band frequency. Accordingly, the first network node 602 may request a specific configuration of air interface resource(s).

As shown by reference number 620, the second network node 604 may transmit, and the first network node 602 may receive, a response that specifies that the first network node 602 may have access to the air interface resource(s). That is, the response may explicitly indicate an access grant and/or the second network node 604 may transmit the response based at least in part on receiving the allocation request. For example, the second network node 604 may transmit, as the response, an allocation acknowledgement that specifies an approval of the allocation request or a denial of the allocation request. Alternatively or additionally, the allocation acknowledgement may indicate a condition for using the air interface resource(s). To illustrate, the second network node 604 may specify a condition for the first network node 602 to meet for using the air interface resource(s), such as an allowed power ratio condition that is based at least in part on an allow power ratio associated with a first power level of a transmission that uses the air interface resource(s) and a second power level of the transmission outside of the air interface resource(s) as described with regard to FIG. 5B. Alternatively or additionally, the second network node 604 may specify a bandwidth condition (e.g., an allowed bandwidth and/or not exceeding the allowed bandwidth) and/or a frequency offset condition (e.g., an allowed frequency offset and/or a transmission that is based at least in part on the allowed frequency offset).

While FIG. 6 shows the second network node 604 transmitting the response and/or the allocation acknowledgement based at least in part on receiving a request from the first network node 602, other examples may include the second network node 604 transmitting to the first network node 602 an implicit indication of an access grant autonomously and/or without receiving a request from the first network node 602. For example, the second network node 604 may transmit, to the first network node 602, an energy saving mode indication associated with the second network node 604 operating in and/or transitioning to an energy saving mode. By transmitting the energy saving mode indication to the first network node 602, the second network node 604 may indicate that the air interface resource(s) assigned to the second network node 604 are available for use by the first network node 602. In some aspects, the energy saving mode indication may specify a sleep duration and/or a sleep cycle of the second network node 604. Alternatively or additionally, the energy saving mode indication may specify a wake-up time at which the second network node 604 is scheduled to wake-up to monitor for communications and/or is scheduled to transition out of the energy saving mode. To illustrate, the energy saving mode indication may specify, as the wake-up time, a time slot, a frame, and/or a symbol. In some aspects, the second network node may indicate one or more energy saving mode parameters in the allocation acknowledgement.

The second network node may transmit, either autonomously or in response to receiving an allocation request, an indication of a synchronization signal block (SSB) transmission pattern. For instance, the second network node 604 may transmit an SSB based at least in part on the SSB transmission pattern and using air interface resource(s) assigned to the second network node. Accordingly, the first network node 602 may derive one or more empty occasions in which the air interface resource(s) are free based at least in part on the SSB transmission pattern. As one example, the indication of the SSB transmission pattern may specify that the SSB transmission pattern is based at least in part on SPS, and the first network node 602 may derive the empty occasions (e.g., an occasion when the second network node is not using a granted air interface resource) based at least in part on an empty occasion associated with the SPS. Accordingly, the SSB transmission pattern may implicitly indicate one or more (empty) occasions for which the second network node 604 grants the first network node 602 access to the air interface resource(s).

As shown by reference number 630, the first network node 602 may assign and/or allocate at least one out-of-band air interface resource to a noise bandwidth. In some aspects, the first network node 602 may first select the out-of-band air interface resource(s) to assign to the noise bandwidth and transmit the request as described with regard to reference number 610 based at least in part on determining that the out-of-band air interface resource(s) are assigned to the second network node 604.

Alternatively or additionally, the first network node 602 may assign and/or allocate the out-of-band air interface resource(s) as part of a noise bandwidth based at least in part on receiving an indication that the air interface resource(s) are available. Accordingly, the first network node 602 may select an air interface resource that is outside of both a transmission frequency band and a configured bandwidth associated with the first network node 602 as described with regard to FIG. 5B and/or based at least in part on receiving an indication of an access grant. The configured bandwidth and/or the transmission frequency bandwidth may be associated with a downlink transmission by the first network node 602, an uplink transmission by the UE 120, and/or a sidelink transmission by the UE 120 to another UE.

Assigning and/or allocating the out-of-band air interface resource(s) may be based at least in part on a condition specified by the second network node 604, a transmission pattern, and/or a schedule as described above. That is, the first network node 602 may distribute and/or shift CFR noise to the out-of-band air interface resource(s) (e.g., using a shaping filter) based at least in part on meeting the condition and/or using empty occasions.

In some aspects, the first network node 602 may assign and/or allocate one or more air interface resources that are inside of a configured bandwidth and outside of a transmission frequency band to a virtual UE as described with regard to FIG. 5A. That is, the first network node 602 may allocate the air interface resource(s) to a virtual UE (e.g., instead of a physical UE connected to the first network node 602) and use the allocated air interface resource(s) as a noise bandwidth. The configured bandwidth and/or the transmission frequency bandwidth may be associated with a downlink transmission by the first network node 602, an uplink transmission by the UE 120, and/or a sidelink transmission by the UE 120 to another UE.

As shown by reference number 640, the first network node 602 may transmit, and a UE 606 may receive, a noise configuration indication that specifies and/or indicates a configuration of a noise bandwidth associated with CFR noise. Alternatively or additionally, the first network node 602 may transmit, and the second network node 604 may receive, the noise configuration indication, as shown by reference number 650. For example, the noise configuration indication may specify any combination of characteristics associated with the noise bandwidth, such as a bandwidth size of the noise bandwidth, a frequency offset associated with locating the noise bandwidth, an allowed power ratio for using the noise bandwidth (e.g., for distributed CFR noise), an allocation type (e.g., a periodic allocation type and/or an SPS allocation type), an active duration (e.g., a sleep duration of the second network node 604), and/or a start time (e.g., a time slot, a frame, and/or a symbol) associated with when the noise bandwidth may be used for CFR noise. In some aspects, the noise configuration indication may specify an air interface resource, such as by indicating an index associated with the air interface resource, a sub-band associated with the air interface resource, and/or a sub-band frequency associated with the air interface resource. Alternatively or additionally, the noise configuration indication may specify that the noise bandwidth is located within a configured bandwidth that includes the transmission frequency band, or that the noise bandwidth is located outside of the configured bandwidth and the transmission frequency band. The first network node 602 may transmit the noise configuration indication based at least in part on receiving the allocation acknowledgement, the energy saving mode indication, and/or the SSB transmission pattern as described with regard to reference number 620. Accordingly, the noise configuration indication may specify a schedule for access to the noise bandwidth.

As shown by reference number 660, the first network node 602 and the UE 606 may communicate based at least in part on a CFR process that distributes at least a portion of CFR noise to an out-of-band location, such as an ICF CFR process as described with regard to FIG. 4. As one example, the first network node 602 may generate and transmit a downlink transmission to the UE 606 based at least in part on distributing at least a portion of CFR noise to an out-of-band location (e.g., by using a shaping filter). Alternatively or additionally, the UE 606 may generate and transmit an uplink transmission based at least in part on distributing at least a portion of CFR noise to an out-of-band location. While the example 600 shows the first network node 602 and the UE 606 communicating based at least in part on distributing CFR noise to an out-of-band air interface resource, other examples may include the UE 606 communicating with another UE based at least in part on a sidelink transmission that the UE 606 generates based at least in part on a CFR process that distributes CFR noise to out-of-band air interface resource(s).

In some aspects, communicating based at least in part on the CFR process and/or distributing at least a portion of CFR noise to an out-of-band air interface resource may be based at least in part on receiving any combination of the energy saving mode indication, the SPS indication, the SSB transmission pattern, and/or receiving the allocation acknowledgement. For instance, the first network node 602 and/or the UE 606 may distribute the CFR noise to the out-of-band air interface resource(s) during a sleep duration of the second network node 604. Alternatively or additionally, the first network node 602 and/or the UE 606 may refrain from distributing the CFR noise to the out-of-band air interface resource(s) during an awake duration of the second network node 604. The communicating may be based at least in part on empty occasions associated with the SSB transmission pattern and/or empty occasions associated with SPS.

Alternatively or additionally, the first network node 602 and/or the UE 606 may distribute the CFR noise such that a first portion of CFR noise within the transmission frequency band has a first power level, and the second portion of the CFR noise outside of the transmission frequency band has a second power level. The first power level and/or the second power level may be based at least in part on a power threshold and/or a power ratio (e.g., indicated by a noise configuration and/or the second network node 604). Accordingly, communicating based at least in part on the CFR process and/or distributing at least a portion of CFR noise to the out-of-band air interface resource may be based at least in part on the noise configuration indication, as described with regard to reference number 640.

Applying CFR to an input signal may reduce a PAPR of the input signal and improve a power efficiency of a power amplifier processing the input signal. Distributing CFR noise to an out-of-band location may enable a device to meet an operating metric associated with operating in a wireless network, such as an in-band EVM metric. Accordingly, the device may distribute and/or shift CFR noise to the out-of-band air interface resource(s) to improve an in-band signal quality (e.g., by reducing in-band EVM). In some aspects, the device may coordinate access to the out-of-band air interface resource(s) and/or partition a configured band assigned to the device to avoid occupying spectrum assigned to and/or utilized by another device. Avoiding spectrum assigned to another device reduces recovery errors, increases data throughput, and/or reduces data transfer latencies in the wireless network.

As indicated above, FIG. 6 is provided as an example. Other examples may differ from what is described with regard to FIG. 6.

Figure 7:
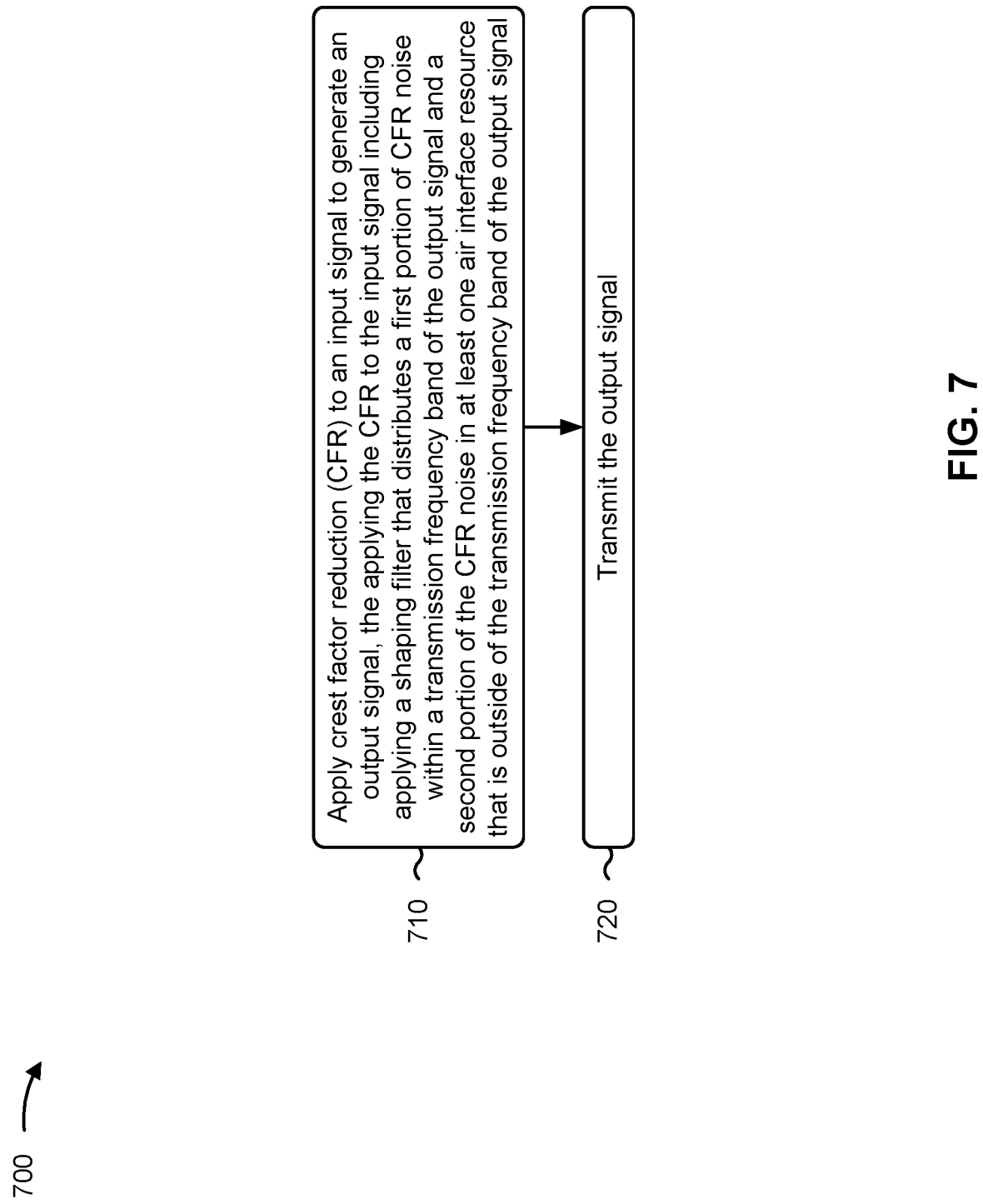
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with spectrum management for CFR distortion.

As shown in FIG. 7, in some aspects, process 700 may include applying CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal (block 710). For example, the network node (e.g., using communication manager 1006, depicted in FIG. 10) may apply CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal, as described above.

As further shown in FIG. 7, in some aspects, process 700 may include transmitting the output signal (block 720). For example, the network node (e.g., using transmission component 1004 and/or communication manager 1006, depicted in FIG. 10) may transmit the output signal, as described above.

Process 700 may include additional aspects, such as any single aspect or any combination of aspects described below and/or in connection with one or more other processes described elsewhere herein.

In a first aspect, applying the CFR includes applying ICF to the input signal.

In a second aspect, a first power level associated with the first portion of the CFR noise and a second power level associated with the second portion of the CFR noise satisfy a power threshold.

In a third aspect, process 700 includes allocating the at least one air interface resource that is outside of the transmission frequency band to a virtual UE.

In a fourth aspect, the at least one air interface resource is within a configured bandwidth that includes the transmission frequency band.

In a fifth aspect, the network node is a first network node, the transmission frequency band is within a configured bandwidth associated with the first network node, process 700 includes transmitting an allocation request that indicates a request for access to the at least one air interface resource, and the at least one air interface resource is outside of the configured bandwidth associated with the first network node and is allocated to a second network node.

In a sixth aspect, the transmitting the allocation request includes transmitting the allocation request to the second network node.

In a seventh aspect, the allocation request indicates at least one of the at least one air interface resource, a bandwidth, a frequency offset, a power ratio, or an allocation type.

In an eighth aspect, process 700 includes receiving an allocation acknowledgement, and distributing the second portion of the CFR noise to the at least one air interface resource based at least in part on receipt of the allocation acknowledgement.

In a ninth aspect, the allocation acknowledgement indicates a condition associated with using the at least one air interface resource.

In a tenth aspect, the condition includes an allowed power ratio.

In an eleventh aspect, the network node is a first network node, and process 700 includes receiving an energy saving mode indication that is associated with a second network node assigned to the at least one air interface resource, and distributing the second portion of the CFR noise to the at least one air interface resource based at least in part on receipt of the energy saving mode indication.

In a twelfth aspect, the energy saving mode indication specifies at least one of a sleep duration, or a wake-up time.

In a thirteenth aspect, the energy saving mode indication specifies the wake-up time based at least in part on indicating at least one of a time slot, a frame, or a symbol.

In a fourteenth aspect, the network node is a first network node, and process 700 includes receiving an indication of an SSB transmission pattern that is associated with a second network node assigned to the at least one air interface resource, and distributing the second portion of the CFR noise to the at least one air interface resource based at least in part on the SSB transmission pattern.

In a fifteenth aspect, the indication of the SSB transmission pattern specifies semi-persistent scheduling associated with the at least one air interface resource, and distributing the second portion of the CFR noise to the at least one air interface resource is based at least in part on the semi-persistent scheduling.

In a sixteenth aspect, the at least one air interface resource is within a configured bandwidth that includes the transmission frequency band and is assigned to the network node, and process 700 includes transmitting a noise configuration indication that specifies a noise bandwidth that includes the at least one air interface resource.

In a seventeenth aspect, the noise configuration indication specifies, for the noise bandwidth, at least one of a bandwidth size, a frequency offset, an allowed power ratio, an allocation type, an active duration, or a start time.

In an eighteenth aspect, the noise configuration indication specifies the start time by indicating at least one of a time slot, a frame, a symbol, or a start of resource block.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
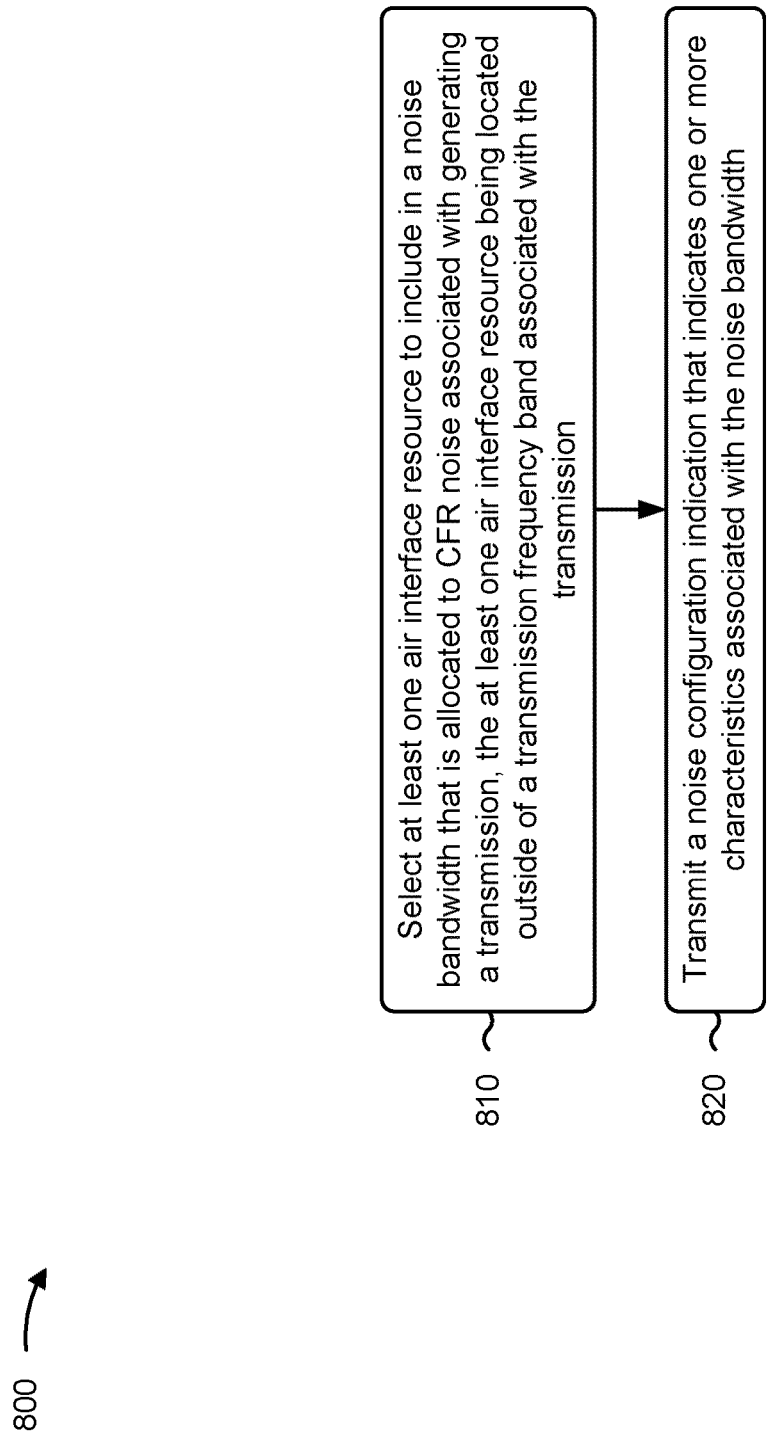
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., a network node 110) performs operations associated with spectrum management for CFR distortion.

As shown in FIG. 8, in some aspects, process 800 may include selecting at least one air interface resource to include in a noise bandwidth that is allocated to CFR noise associated with generating a transmission, the at least one air interface resource being located outside of a transmission frequency band associated with the transmission (block 810). For example, the network node (e.g., using communication manager 1006, depicted in FIG. 10) may select at least one air interface resource to include in a noise bandwidth that is allocated to CFR noise associated with generating a transmission, the at least one air interface resource being located outside of a transmission frequency band associated with the transmission, as described above.

As further shown in FIG. 8, in some aspects, process 800 may include transmitting a noise configuration indication that indicates one or more characteristics associated with the noise bandwidth (block 820). For example, the network node (e.g., using transmission component 1004 and/or communication manager 1006, depicted in FIG. 10) may transmit a noise configuration indication that indicates one or more characteristics associated with the noise bandwidth, as described above.

Process 800 may include additional aspects, such as any single aspect or any combination of aspects described below and/or in connection with one or more other processes described elsewhere herein.

In a first aspect, the transmission includes at least one of an uplink transmission, a sidelink transmission, or a downlink transmission.

In a second aspect, process 800 includes allocating the air interface resource to a virtual UE.

In a third aspect, the at least one air interface resource is within a configured bandwidth associated with a UE.

In a fourth aspect, the network node is a first network node, the at least one air interface resource is associated with a second network node, and process 800 includes transmitting an allocation request that indicates a request for access to the air interface resource.

In a fifth aspect, the transmitting the allocation request includes transmitting the allocation request to the second network node.

In a sixth aspect, the allocation request indicates at least one of the at least one air interface resource, a bandwidth, a frequency offset, a power ratio, or an allocation type.

In a seventh aspect, process 800 includes receiving an allocation acknowledgement, and the noise configuration indication is based at least in part on the allocation acknowledgement.

In an eighth aspect, the allocation acknowledgement indicates a condition associated with using the air interface resource.

In a ninth aspect, the condition includes an allowed power ratio.

In a tenth aspect, the network node is a first network node, process 800 includes receiving an energy saving mode indication from a second network node assigned to the at least one air interface resource, and the noise configuration indication is based at least in part on the energy saving mode indication.

In an eleventh aspect, the energy saving mode indication specifies at least one of a sleep duration, or a wake-up time.

In a twelfth aspect, the energy saving mode indication specifies the wake-up time based at least in part on at least one of a time slot, a frame, a symbol, or a start of a resource block.

In a thirteenth aspect, the network node is a first network node, and process 800 includes receiving an indication of an SSB transmission pattern from a second network node assigned to the at least one air interface resource, and the noise configuration indication is based at least in part on the SSB transmission pattern.

In a fourteenth aspect, the indication of the SSB transmission pattern specifies semi-persistent scheduling associated with the at least one air interface resource.

In a fifteenth aspect, the noise bandwidth is within a configured bandwidth that includes the transmission frequency band.

In a sixteenth aspect, the one or more characteristics associated with the noise bandwidth include at least one of a bandwidth size, a frequency offset, an allowed power ratio, an allocation type, an active duration, or a start time.

In a seventeenth aspect, the noise configuration indication specifies the start time based at least in part on at least one of a time slot, a frame, a symbol, or a start of a resource block.

In an eighteenth aspect, the noise configuration indication specifies at least one frequency associated with the at least one air interface resource and the noise bandwidth.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
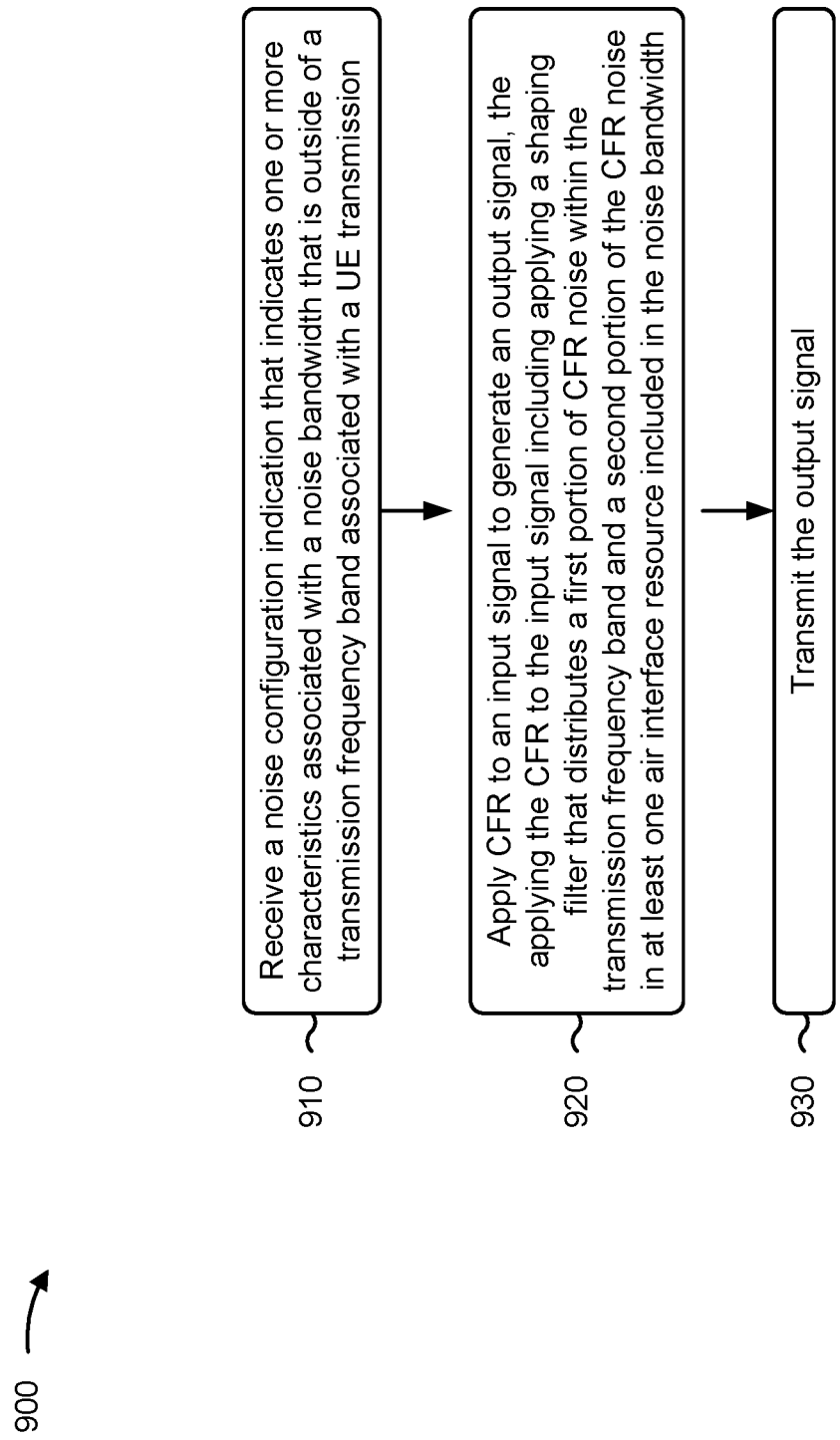
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with spectrum management for CFR distortion.

As shown in FIG. 9, in some aspects, process 900 may include receiving a noise configuration indication that indicates one or more characteristics associated with a noise bandwidth that is outside of a transmission frequency band associated with a UE transmission (block 910). For example, the UE (e.g., using reception component 1102 and/or communication manager 1106, depicted in FIG. 11) may receive a noise configuration indication that indicates one or more characteristics associated with a noise bandwidth that is outside of a transmission frequency band associated with a UE transmission, as described above.

As further shown in FIG. 9, in some aspects, process 900 may include applying CFR to an input signal to generate an output signal, the applying the CFR to the input signal including applying a shaping filter that distributes a first portion of CFR noise within the transmission frequency band and a second portion of the CFR noise in at least one air interface resource included in the noise bandwidth (block 920). For example, the UE (e.g., using communication manager 1106, depicted in FIG. 11) may apply CFR to an input signal to generate an output signal, the applying the CFR to the input signal including applying a shaping filter that distributes a first portion of CFR noise within the transmission frequency band and a second portion of the CFR noise in at least one air interface resource included in the noise bandwidth, as described above.

As further shown in FIG. 9, in some aspects, process 900 may include transmitting the output signal (block 930). For example, the UE (e.g., using transmission component 1104 and/or communication manager 1106, depicted in FIG. 11) may transmit the output signal, as described above.

Process 900 may include additional aspects, such as any single aspect or any combination of aspects described below and/or in connection with one or more other processes described elsewhere herein.

In a first aspect, the UE transmission includes at least one of an uplink transmission, or a sidelink transmission.

In a second aspect, applying the CFR includes applying ICF to the input signal.

In a third aspect, the one or more characteristics associated with the noise bandwidth include at least one of a bandwidth size, a frequency offset, an allowed power ratio, an allocation type, an active duration, or a start time.

In a fourth aspect, the noise configuration indication specifies the start time by indicating at least one of a time slot, a frame, a symbol, or a start of resource block.

In a fifth aspect, the noise bandwidth is within a configured bandwidth associated with the UE.

In a sixth aspect, the noise bandwidth is outside of a configured bandwidth associated with the UE.

In a seventh aspect, process 900 includes at least one frequency associated with the at least one air interface resource and the noise bandwidth.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
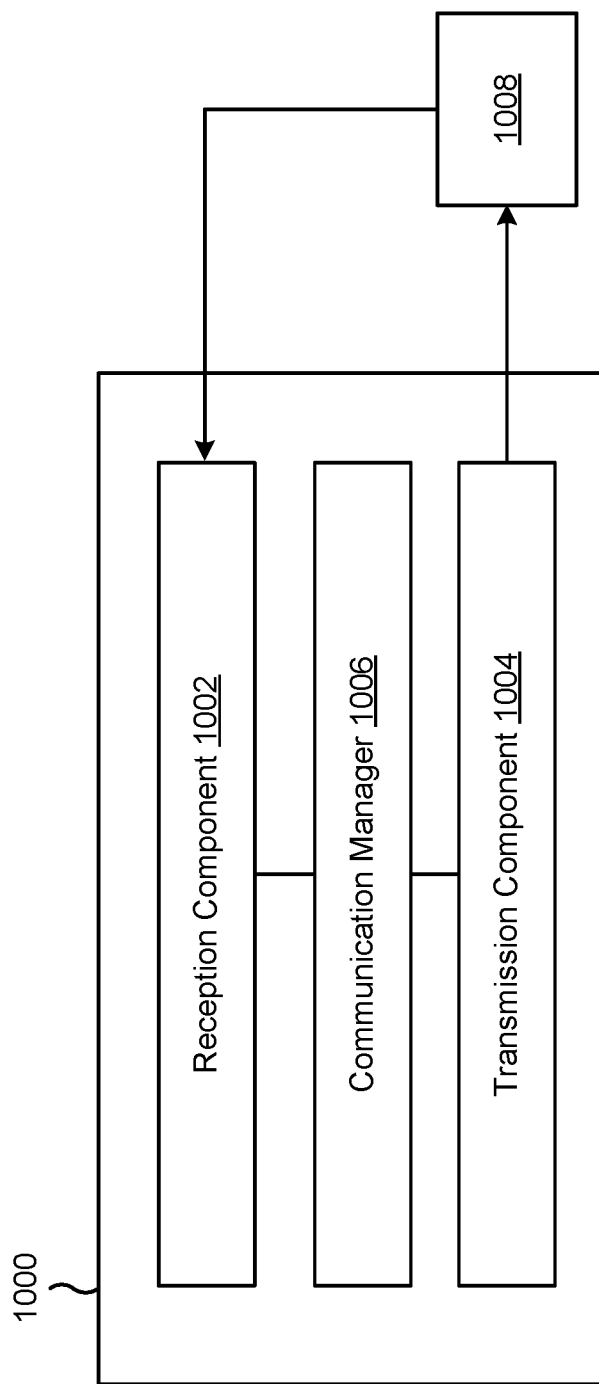
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-9. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may apply CFR to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal. The transmission component 1004 may transmit the output signal.

The communication manager 1006 may allocate the at least one air interface resource that is outside of the transmission frequency band to a virtual UE.

The reception component 1002 may receive an allocation acknowledgement.

The communication manager 1006 may distribute the second portion of the CFR noise to the at least one air interface resource based at least in part on receipt of the allocation acknowledgement.

The communication manager 1006 may select at least one air interface resource to include in a noise bandwidth that is allocated to CFR noise associated with generating a transmission, the at least one air interface resource being located outside of a transmission frequency band associated with the transmission. The transmission component 1004 may transmit a noise configuration indication that indicates one or more characteristics associated with the noise bandwidth.

The communication manager 1006 may allocate the air interface resource to a virtual UE.

The reception component 1002 may receive an allocation acknowledgement and the noise configuration indication is based at least in part on the allocation acknowledgement.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
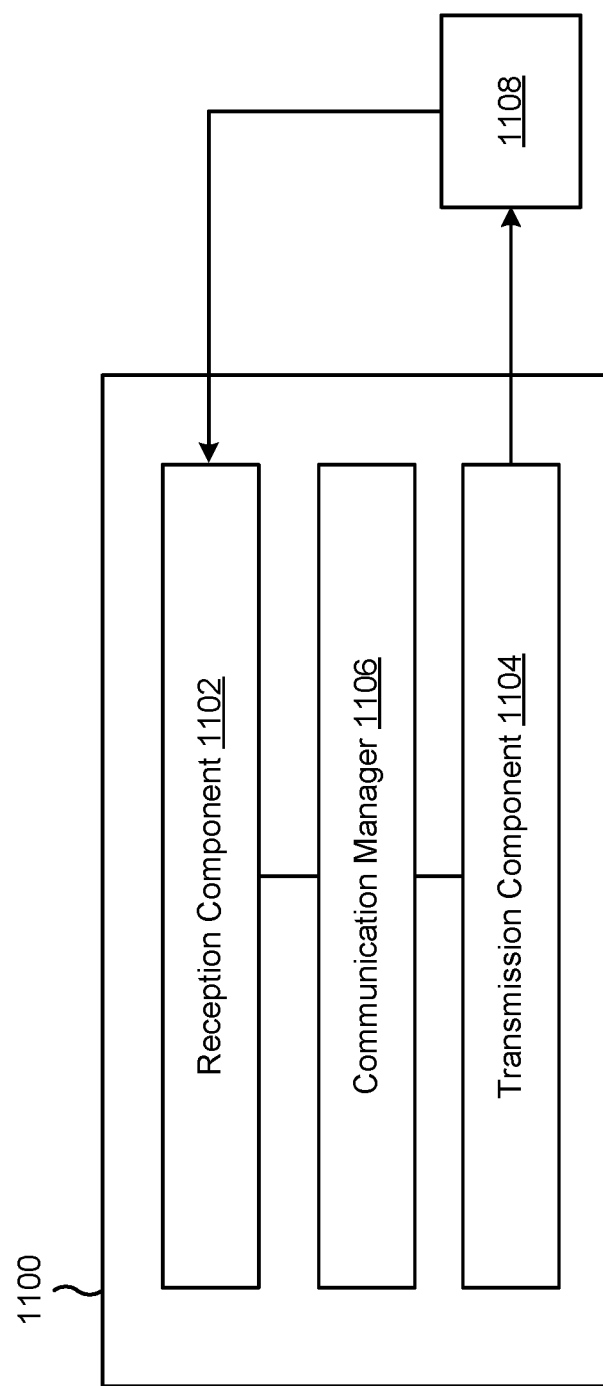
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-9. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/ or provide control information to the reception component 1102 and/or the transmission component 1104 to control reception and/or transmission of communications.

The reception component 1102 may receive a noise configuration indication that indicates one or more characteristics associated with a noise bandwidth that is outside of a transmission frequency band associated with a UE transmission. The communication manager 1106 may apply CFR to an input signal to generate an output signal, the applying the CFR to the input signal including applying a shaping filter that distributes a first portion of CFR noise within the transmission frequency band and a second portion of the CFR noise in at least one air interface resource included in the noise bandwidth. The transmission component 1104 may transmit the output signal.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: applying a crest factor reduction (CFR) to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal; and transmitting the output signal.

Aspect 2: The method of Aspect 1, wherein the applying the crest factor reduction comprises: applying iterative clipping and filtering (ICF) to the input signal.

Aspect 3: The method of any of Aspects 1-2, wherein a first power level associated with the first portion of the CFR noise and a second power level associated with the second portion of the CFR noise satisfy a power threshold.

Aspect 4: The method of any of Aspects 1-3, further comprising: allocating the at least one air interface resource that is outside of the transmission frequency band to a virtual user equipment (UE).

Aspect 5: The method of any of Aspects 1-4, wherein the at least one air interface resource is within a configured bandwidth that includes the transmission frequency band.

Aspect 6: The method of any of Aspects 1-5, wherein the network node is a first network node, the transmission frequency band is within a configured bandwidth associated with the first network node, and the method further comprises: transmitting an allocation request that indicates a request for access to the at least one air interface resource, wherein the at least one air interface resource is outside of the configured bandwidth associated with the first network node and is allocated to a second network node.

Aspect 7: The method of Aspect 6, wherein the transmitting the allocation request comprises: transmitting the allocation request to the second network node.

Aspect 8: The method of Aspect 6 or Aspect 7, wherein the allocation request indicates at least one of: the at least one air interface resource, a bandwidth, a frequency offset, a power ratio, or an allocation type.

Aspect 9: The method of any one of Aspects 6-8, further comprising: receiving an allocation acknowledgement; and distributing the second portion of the CFR noise to the at least one air interface resource based at least in part on the receiving the allocation acknowledgement.

Aspect 10: The method of Aspect 9, wherein the allocation acknowledgement indicates a condition associated with using the at least one air interface resource.

Aspect 11: The method of Aspect 10, wherein the condition comprises an allowed power ratio.

Aspect 12: The method of any of Aspects 1-11, wherein the network node is a first network node, and the method further comprises: receiving an energy saving mode indication that is associated with a second network node assigned to the at least one air interface resource; and distributing the second portion of the CFR noise to the at least one air interface resource based at least in part on the receiving the energy saving mode indication.

Aspect 13: The method of Aspect 12, wherein the energy saving mode indication specifies at least one of: a sleep duration, or a wake-up time.

Aspect 14: The method of Aspect 13, wherein the energy saving mode indication specifies the wake-up time based at least in part on indicating at least one of: a time slot, a frame, or a symbol.

Aspect 15: The method of any of Aspects 1-14, wherein the network node is a first network node, and the method further comprises: receiving an indication of a synchronization signal block (SSB) transmission pattern that is associated with a second network node assigned to the at least one air interface resource; and distributing the second portion of the CFR noise to the at least one air interface resource based at least in part on the SSB transmission pattern.

Aspect 16: The method of Aspect 15, wherein the indication of the SSB transmission pattern specifies semi-persistent scheduling associated with the at least one air interface resource, and wherein the distributing the second portion of the CFR noise to the at least one air interface resource based at least in part on the semi-persistent scheduling.

Aspect 17: The method of any of Aspects 1-16, wherein the at least one air interface resource is within a configured bandwidth that includes the transmission frequency band and is assigned to the network node, and the method further comprises: transmitting a noise configuration indication that specifies a noise bandwidth that includes the at least one air interface resource.

Aspect 18: The method of Aspect 17, wherein the noise configuration indication specifies, for the noise bandwidth, at least one of: a bandwidth size, a frequency offset, an allowed power ratio, an allocation type, an active duration, or a start time.

Aspect 19: The method of Aspect 18, wherein the noise configuration indication specifies the start time by indicating at least one of: a time slot, a frame, a symbol, or a start of resource block.

Aspect 20: A method of wireless communication performed by a network node, comprising: selecting at least one air interface resource to include in a noise bandwidth that is allocated to CFR noise associated with generating a transmission, the at least one air interface resource being located outside of a transmission frequency band associated with the transmission; and transmitting a noise configuration indication that indicates one or more characteristics associated with the noise bandwidth.

Aspect 21: The method of Aspect 20, wherein the transmission comprises at least one of: an uplink transmission, a sidelink transmission, or a downlink transmission.

Aspect 22: The method of any of Aspects 20-21, further comprising: allocating the air interface resource to a virtual user equipment (UE).

Aspect 23: The method of any of Aspects 20-22, wherein the at least one air interface resource is within a configured bandwidth associated with a user equipment (UE).

Aspect 24: The method of any of Aspects 20-23, wherein the network node is a first network node, the at least one air interface resource is associated with a second network node, and the method further comprises: transmitting an allocation request that indicates a request for access to the air interface resource.

Aspect 25: The method of Aspect 24, wherein the transmitting the allocation request comprises: transmitting the allocation request to the second network node.

Aspect 26: The method of Aspect 24, wherein the allocation request indicates at least one of: the at least one air interface resource, a bandwidth, a frequency offset, a power ratio, or an allocation type.

Aspect 27: The method of Aspect 24, further comprising: receiving an allocation acknowledgement, wherein the noise configuration indication is based at least in part on the allocation acknowledgement.

Aspect 28: The method of Aspect 27, wherein the allocation acknowledgement indicates a condition associated with using the air interface resource.

Aspect 29: The method of Aspect 28, wherein the condition comprises an allowed power ratio.

Aspect 30: The method of any of Aspects 20-29, wherein the network node is a first network node, and the method further comprises: receiving an energy saving mode indication from a second network node assigned to the at least one air interface resource, wherein the noise configuration indication is based at least in part on the energy saving mode indication.

Aspect 31: The method of Aspect 30, wherein the energy saving mode indication specifies at least one of: a sleep duration, or a wake-up time.

Aspect 32: The method of Aspect 31, wherein the energy saving mode indication specifies the wake-up time based at least in part on at least one of: a time slot, a frame, a symbol, or a start of a resource block.

Aspect 33: The method of any of Aspects 20-32, wherein the network node is a first network node, and the method further comprises: receiving an indication of a synchronization signal block (SSB) transmission pattern from a second network node assigned to the at least one air interface resource, wherein the noise configuration indication is based at least in part on the SSB transmission pattern.

Aspect 34: The method of Aspect 33, wherein the indication of the SSB transmission pattern specifies semi-persistent scheduling associated with the at least one air interface resource.

Aspect 35: The method of any of Aspects 20-34, wherein the noise bandwidth is within a configured bandwidth that includes the transmission frequency band.

Aspect 36: The method of any of Aspects 20-35, wherein the one or more characteristics associated with the noise bandwidth include at least one of: a bandwidth size, a frequency offset, an allowed power ratio, an allocation type, an active duration, or a start time.

Aspect 37: The method of Aspect 36, wherein the noise configuration indication specifies the start time based at least in part on at least one of: a time slot, a frame, a symbol, or a start of a resource block.

Aspect 38: The method of any of Aspects 20-37, wherein the noise configuration indication specifies: at least one frequency associated with the at least one air interface resource and the noise bandwidth.

Aspect 39: A method of wireless communication performed by a user equipment (UE), comprising: receiving a noise configuration indication that indicates one or more characteristics associated with a noise bandwidth that is outside of a transmission frequency band associated with a UE transmission; applying a crest factor reduction (CFR) to an input signal to generate an output signal, the applying the crest factor reduction to the input signal including applying a shaping filter that distributes a first portion of CFR noise within the transmission frequency band and a second portion of the CFR noise in at least one air interface resource included in the noise bandwidth; and transmitting the output signal.

Aspect 40: The method of Aspect 39, wherein the UE transmission comprises at least one of: an uplink transmission, or a sidelink transmission.

Aspect 41: The method of any of Aspects 39-40, wherein applying the crest factor reduction comprises: applying iterative clipping and filtering (ICF) to the input signal.

Aspect 42: The method of any of Aspects 39-41, wherein the one or more characteristics associated with the noise bandwidth include at least one of: a bandwidth size, a frequency offset, an allowed power ratio, an allocation type, an active duration, or a start time.

Aspect 43: The method of Aspect 42, wherein the noise configuration indication specifies the start time by indicating at least one of: a time slot, a frame, a symbol, or a start of resource block.

Aspect 44: The method of any of Aspects 39-43, wherein the noise bandwidth is within a configured bandwidth associated with the UE.

Aspect 45: The method of any of Aspects 39-44, wherein the noise bandwidth is outside of a configured bandwidth associated with the UE.

Aspect 46: The method of any of Aspects 39-45 wherein the noise configuration indication specifies: at least one frequency associated with the at least one air interface resource and the noise bandwidth.

Aspect 47: An apparatus for wireless communication at a device, comprising a processor; memory coupled with the processor; and instructions stored in the memory and executable by the processor to cause the device to perform the method of one or more of Aspects 1-19.

Aspect 48: An apparatus for wireless communication at a device, comprising a processor; memory coupled with the processor; and instructions stored in the memory and executable by the processor to cause the device to perform the method of one or more of Aspects 20-38.

Aspect 49: An apparatus for wireless communication at a device, comprising a processor; memory coupled with the processor; and instructions stored in the memory and executable by the processor to cause the device to perform the method of one or more of Aspects 39-46.

Aspect 50: A device for wireless communication, comprising a memory and one or more processors coupled to the memory, the one or more processors configured to perform the method of one or more of Aspects 1-19.

Aspect 51: A device for wireless communication, comprising a memory and one or more processors coupled to the memory, the one or more processors configured to perform the method of one or more of Aspects 20-38.

Aspect 52: A device for wireless communication, comprising a memory and one or more processors coupled to the memory, the one or more processors configured to perform the method of one or more of Aspects 39-46.

Aspect 53: An apparatus for wireless communication, comprising at least one means for performing the method of one or more of Aspects 1-19.

Aspect 54: An apparatus for wireless communication, comprising at least one means for performing the method of one or more of Aspects 20-38.

Aspect 55: An apparatus for wireless communication, comprising at least one means for performing the method of one or more of Aspects 39-46.

Aspect 56: A non-transitory computer-readable medium storing code for wireless communication, the code comprising instructions executable by a processor to perform the method of one or more of Aspects 1-19.

Aspect 57: A non-transitory computer-readable medium storing code for wireless communication, the code comprising instructions executable by a processor to perform the method of one or more of Aspects 20-38.

Aspect 58: A non-transitory computer-readable medium storing code for wireless communication, the code comprising instructions executable by a processor to perform the method of one or more of Aspects 39-46.

Aspect 59: A non-transitory computer-readable medium storing a set of instructions for wireless communication, the set of instructions comprising one or more instructions that, when executed by one or more processors of a device, cause the device to perform the method of one or more of Aspects 1-19.

Aspect 60: A non-transitory computer-readable medium storing a set of instructions for wireless communication, the set of instructions comprising one or more instructions that, when executed by one or more processors of a device, cause the device to perform the method of one or more of Aspects 20-38.

Aspect 61: A non-transitory computer-readable medium storing a set of instructions for wireless communication, the set of instructions comprising one or more instructions that, when executed by one or more processors of a device, cause the device to perform the method of one or more of Aspects 39-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   one or more memories; and
   one or more processors, coupled to the one or more memories, the one or more memories storing instructions that are executable by the one or more processors to cause the network node to:
   apply a crest factor reduction (CFR) to an input signal to generate an output signal, the instructions stored in the one or more memories being executable by the one or more processors to, when applying the CFR to the input signal, cause the network node to apply a shaping filter that distributes a first portion of CFR noise within a transmission frequency band of the output signal and a second portion of the CFR noise in at least one air interface resource that is outside of the transmission frequency band of the output signal; and transmit the output signal.

2. The apparatus of claim 1, wherein the one or more memories store instructions executable by the one or more processors to, when applying the CFR to the input signal, cause the network node to:

apply iterative clipping and filtering (ICF) to the input signal.

3. The apparatus of claim 1, wherein the one or more memories store instructions executable by the one or more processors to cause the network node to:

allocate the at least one air interface resource that is outside of the transmission frequency band to a virtual user equipment (UE).

4. The apparatus of claim 1, wherein the at least one air interface resource is within a configured bandwidth that includes the transmission frequency band.

5. The apparatus of claim 1, wherein the network node is a first network node, and wherein the one or more memories store instructions executable by the one or more processors to cause the first network node to:

transmit an allocation request that indicates a request for access to the at least one air interface resource, wherein the at least one air interface resource is outside of a configured bandwidth associated with the first network node, wherein the at least one air interface resource is allocated to a second network node.

6. The apparatus of claim 5, wherein the allocation request indicates at least one of:

the at least one air interface resource, a bandwidth, a frequency offset, a power ratio, or an allocation type.

7. The apparatus of claim 5, wherein the one or more memories store instructions executable by the one or more processors to cause the first network node to:

receive an allocation acknowledgement; and distribute the second portion of the CFR noise to the at least one air interface resource based at least in part on receipt of the allocation acknowledgement.

8. The apparatus of claim 1, wherein the one or more memories store instructions executable by the one or more processors to cause the network node to:

receive an energy saving mode indication that is associated with a second network node assigned to the at least one air interface resource; and distribute the second portion of the CFR noise to the at least one air interface resource based at least in part on receipt the energy saving mode indication.

9. The apparatus of claim 1, wherein the one or more memories store instructions executable by the one or more processors to cause the network node to:

receive an indication of a synchronization signal block (SSB) transmission pattern that is associated with a second network node assigned to the at least one air interface resource; and distribute the second portion of the CFR noise to the at least one air interface resource based at least in part on the SSB transmission pattern.

10. The apparatus of claim 1, wherein the at least one air interface resource is within a configured bandwidth that includes the transmission frequency band, wherein the configured bandwidth is assigned to the network node, and wherein the one or more memories store instructions executable by the one or more processors to cause the network node to:

transmit a noise configuration indication that specifies a noise bandwidth that includes the at least one air interface resource.

11. An apparatus for wireless communication at a network node, comprising:

one or more memories; and one or more processors, coupled to the one or more memories, the one or more memories storing instructions that are executable by the one or more processors to cause the network node to:

select at least one air interface resource to include in a noise bandwidth that is allocated to crest factor reduction (CFR) noise associated with generating a transmission, the at least one air interface resource being located outside of a transmission frequency band associated with the transmission; and transmit a noise configuration indication that indicates one or more characteristics associated with the noise bandwidth.

12. The apparatus of claim 11, wherein the transmission comprises at least one of:

an uplink transmission, a sidelink transmission, or a downlink transmission.

13. The apparatus of claim 11, wherein the one or more memories store instructions executable by the one or more processors to cause the network node to:

allocate the air interface resource to a virtual user equipment (UE).

14. The apparatus of claim 11, wherein the at least one air interface resource is within a configured bandwidth associated with a user equipment (UE).

15. The apparatus of claim 11, wherein the one or more memories store instructions executable by the one or more processors to cause the network node to:

transmit an allocation request that indicates a request for access to the air interface resource.

16. The apparatus of claim 15, wherein the one or more memories store instructions executable by the one or more processors to cause the network node to:

receive an allocation acknowledgement, wherein the noise configuration indication is based at least in part on the allocation acknowledgement.

17. The apparatus of claim 16, wherein the allocation acknowledgement indicates a condition associated with using the air interface resource.

18. The apparatus of claim 11, wherein the one or more memories store instructions executable by the one or more processors to cause the network node to:

receive an energy saving mode indication from a second network node assigned to the at least one air interface resource, wherein the noise configuration indication is based at least in part on the energy saving mode indication.

19. The apparatus of claim 11, wherein the one or more memories store instructions executable by the one or more processors to cause the network node to:

receive an indication of a synchronization signal block (SSB) transmission pattern from a second network node assigned to the at least one air interface resource, wherein the noise configuration indication is based at least in part on the SSB transmission pattern.

20. The apparatus of claim 11, wherein the noise bandwidth is within a configured bandwidth that includes the transmission frequency band.

21. An apparatus for wireless communication at a user equipment (UE), comprising:
one or more memories; and
one or more processors, coupled to the one or more memories, the one or more memories storing instructions that are executable by the one or more processors to cause the UE to:
receive a noise configuration indication that indicates one or more characteristics associated with a noise bandwidth that is outside of a transmission frequency band associated with a UE transmission;
apply a crest factor reduction (CFR) to an input signal to generate an output signal, the one or more memories storing instructions executable by the one or more processors to, when applying the CFR to the input signal, cause the UE to apply a shaping filter that distributes a first portion of CFR noise within the transmission frequency band and a second portion of the CFR noise in at least one air interface resource included in the noise bandwidth; and
transmit the output signal.

22. The apparatus of claim 21, wherein the UE transmission comprises at least one of:
an uplink transmission, or
a sidelink transmission.

23. The apparatus of claim 21, wherein the one or more characteristics associated with the noise bandwidth include at least one of:
a bandwidth size,
a frequency offset,
an allowed power ratio,
an allocation type,
an active duration, or
a start time.

24. The apparatus of claim 21, wherein the noise bandwidth is within a configured bandwidth associated with the UE.

25. The apparatus of claim 21, wherein the noise bandwidth is outside of a configured bandwidth associated with the UE.

26. The apparatus of claim 21, wherein the noise configuration indication specifies:
at least one frequency associated with the at least one air interface resource and the noise bandwidth.

27. A method of wireless communication performed by a network node, comprising:
applying a crest factor reduction (CFR) to an input signal to generate an output signal, the applying the CFR to the input signal including applying a shaping filter that distributes a first portion of CFR noise within a transmission frequency band of the output signal and a second portion of the CFR noise in at least one air interface resource that is outside of the transmission frequency band of the output signal; and
transmitting the output signal.

28. The method of claim 27, further comprising:
allocating the at least one air interface resource that is outside of the transmission frequency band to a virtual user equipment (UE).

29. The method of claim 27, wherein the network node is a first network node, the transmission frequency band is within a configured bandwidth associated with the first network node, and the method further comprises:
transmitting an allocation request that indicates a request for access to the at least one air interface resource, wherein the at least one air interface resource is outside of the configured bandwidth associated with the first network node and is allocated to a second network node.

30. The method of claim 29, further comprising:
receiving an allocation acknowledgement; and
distributing the second portion of the CFR noise to the at least one air interface resource based at least in part on the receiving the allocation acknowledgement.

* * * * *